US010908966B1

(12) United States Patent
Frandzel et al.

(10) Patent No.: US 10,908,966 B1
(45) Date of Patent: Feb. 2, 2021

(54) ADAPTING TARGET SERVICE TIMES IN A STORAGE SYSTEM

(71) Applicant: PURE STORAGE, INC., Mountain View, CA (US)

(72) Inventors: Yuval Frandzel, Foster City, CA (US); Shuaiwei Cui, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 16/360,349

(22) Filed: Mar. 21, 2019

Related U.S. Application Data

(63) Continuation-in-part of application No. 15/385,048, filed on Dec. 20, 2016, now Pat. No. 10,585,711.
(Continued)

(51) Int. Cl.
*G06F 9/50* (2006.01)
*G06F 13/16* (2006.01)
(Continued)

(52) U.S. Cl.
CPC .............. *G06F 9/505* (2013.01); *G06F 3/067* (2013.01); *G06F 3/0611* (2013.01);
(Continued)

(58) Field of Classification Search
CPC .... G06F 3/0611; G06F 3/0613; G06F 3/6659; G06F 3/0665; G06F 3/067; G06F 3/0689;
(Continued)

(56) References Cited

U.S. PATENT DOCUMENTS 5,706,210 A  1/1998 Kumano et al.
5,799,200 A  8/1998 Brant et al.
(Continued)

FOREIGN PATENT DOCUMENTS

EP  0725324 A2  8/1996
WO  WO-2012/087648 A1  6/2012
(Continued)

OTHER PUBLICATIONS

Ongaro et al., *Scheduling I/0 in Virtual Machine Monitors*, 2008 ACM SIGPLAN/SIGOPS International Conference On Virtual Execution Environments (VEE '08), Mar. 2008, 10 pages, ACM, New York, NY, XP058211877, DOI: 10.1145/1346256.1346258, ISBN: 978-1-59593-796-4.
(Continued)

*Primary Examiner* — Henry Tsai
*Assistant Examiner* — Christopher A Daley

(57) ABSTRACT

Adapting target service times in a storage system, including: in response to detecting that a measured service time for I/O requests in a storage system is failing to meet a target service time for the I/O requests, reducing an I/O capacity of the I/O requests in the storage system; determining that reducing the I/O capacity of the I/O requests to meet to the target service time causes the I/O capacity of the I/O requests to cross a threshold I/O capacity for the storage system; and in response to determining that the I/O capacity of the I/O requests has crossed the threshold I/O capacity for the storage system: determining an updated service time based on the measured service time for the I/O requests in the storage system; and updating the target service time based on the updated service time.

17 Claims, 17 Drawing Sheets

Related U.S. Application Data which is a continuation of application No. 15/382,888, filed on Dec. 19, 2016, now Pat. No. 10,146,585.

(60) Provisional application No. 62/384,691, filed on Sep. 7, 2016.

(51) Int. Cl.
*G06F 9/48* (2006.01)
*G06F 3/06* (2006.01)

(52) U.S. Cl.
CPC .......... *G06F 3/0613* (2013.01); *G06F 3/0659* (2013.01); *G06F 3/0665* (2013.01); *G06F 3/0689* (2013.01); *G06F 9/4881* (2013.01); *G06F 9/4887* (2013.01); *G06F 9/5038* (2013.01); *G06F 13/16* (2013.01); *G06F 13/1642* (2013.01); *G06F 3/061* (2013.01)

(58) Field of Classification Search
CPC .... G06F 13/16; G06F 13/5038; G06F 9/4887; G06F 9/5038; G06F 9/067
See application file for complete search history.

(56) References Cited

U.S. PATENT DOCUMENTS

| | | | |
|---|---|---|---|
| 5,933,598 A | 8/1999 | Scales et al. | |
| 6,012,032 A | 1/2000 | Donovan et al. | |
| 6,085,333 A | 7/2000 | Dekoning et al. | |
| 6,643,641 B1 | 11/2003 | Snyder | |
| 6,647,514 B1 | 11/2003 | Umberger et al. | |
| 6,690,649 B1 | 2/2004 | Shimada | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,386,620 B2 | 6/2008 | Lei et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 7,974,204 B2 | 7/2011 | Santiago et al. | |
| 8,042,163 B1 | 10/2011 | Karr et al. | |
| 8,046,464 B2 | 10/2011 | Wang et al. | |
| 8,086,585 B1 | 12/2011 | Brashers et al. | |
| 8,200,887 B2 | 6/2012 | Bennett | |
| 8,271,700 B1 | 9/2012 | Annem et al. | |
| 8,289,861 B2 | 10/2012 | Zafer et al. | |
| 8,340,100 B2 | 12/2012 | Oh | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,599,720 B2 | 12/2013 | Babbar | |
| 8,613,066 B1 | 12/2013 | Brezinski et al. | |
| 8,620,970 B2 | 12/2013 | English et al. | |
| 8,670,310 B2 | 3/2014 | Sharma et al. | |
| 8,751,463 B1 | 6/2014 | Chamness | |
| 8,756,310 B2* | 6/2014 | Agarwala ........... H04L 43/0882 709/224 |
| 8,762,642 B2 | 6/2014 | Bates et al. | |
| 8,769,622 B2 | 7/2014 | Chang et al. | |
| 8,769,651 B2 | 7/2014 | Grajek et al. | |
| 8,775,549 B1 | 7/2014 | Taylor | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,913,987 B2 | 12/2014 | Lee et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,453 B1* | 3/2015 | Bora ........... G06F 3/061 710/29 |
| 8,990,905 B1 | 3/2015 | Bailey et al. | |
| 9,081,713 B1 | 7/2015 | Bennett | |
| 9,083,691 B2 | 7/2015 | Banford | |
| 9,124,569 B2 | 9/2015 | Hussain et al. | |
| 9,130,927 B2 | 9/2015 | Ju et al. | |
| 9,134,922 B2 | 9/2015 | Rajagopal et al. | |
| 9,137,330 B2* | 9/2015 | Haner ........... H04L 67/322 |
| 9,189,334 B2 | 11/2015 | Bennett | |
| 9,197,739 B1 | 11/2015 | Shani | |
| 9,209,973 B2 | 12/2015 | Aikas et al. | |
| 9,225,615 B2 | 12/2015 | Seo et al. | |
| 9,250,823 B1 | 2/2016 | Kamat et al. | |
| 9,258,200 B2* | 2/2016 | Wan ........... H04L 43/08 |
| 9,300,660 B1 | 3/2016 | Borowiec et al. | |
| 9,311,182 B2 | 4/2016 | Bennett | |
| 9,444,822 B1 | 9/2016 | Borowiec et al. | |
| 9,507,532 B1 | 11/2016 | Colgrove et al. | |
| 9,632,870 B2 | 4/2017 | Bennett | |
| 9,699,170 B2 | 7/2017 | Sondhi et al. | |
| 9,898,224 B1 | 2/2018 | Marshak et al. | |
| 10,048,864 B2* | 8/2018 | Reinart ........... G06F 3/064 |
| 10,048,874 B1 | 8/2018 | Shveidel et al. | |
| 10,082,983 B2* | 9/2018 | Iyengar ........... G06F 3/0653 |
| 10,146,585 B2 | 12/2018 | Frandzel et al. | |
| 10,178,011 B2 | 1/2019 | Kamath et al. | |
| 10,268,526 B1* | 4/2019 | Martin ........... G06F 9/542 |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0208920 A1 | 9/2007 | Tevis | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0016210 A1 | 1/2011 | Underwood | |
| 2011/0072290 A1 | 3/2011 | Davis et al. | |
| 2011/0125955 A1 | 5/2011 | Chen | |
| 2011/0131231 A1 | 6/2011 | Haas et al. | |

(56) References Cited

U.S. PATENT DOCUMENTS

| | | |
|---|---|---|
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0199148 A1* | 7/2015 | Hrischuk ............ G06F 3/0653 711/114 |
| 2015/0234756 A1 | 8/2015 | Tuers et al. |
| 2015/0378888 A1 | 12/2015 | Zhang et al. |
| 2016/0044024 A1 | 2/2016 | Hwang |
| 2016/0098323 A1 | 4/2016 | Mutha et al. |
| 2016/0196221 A1 | 7/2016 | Wan |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2016/0378389 A1* | 12/2016 | Hrischuk ............ G06F 3/0631 711/154 |
| 2017/0017412 A1 | 1/2017 | Luan et al. |
| 2017/0024144 A1* | 1/2017 | Hrischuk ............ G06F 3/0611 |
| 2017/0034064 A1* | 2/2017 | Everhart ............. H04L 47/25 |
| 2017/0103030 A1 | 4/2017 | Luo |
| 2017/0139834 A1 | 5/2017 | Gupta et al. |
| 2017/0168729 A1* | 6/2017 | Faulkner ............ G06F 3/0613 |
| 2017/0201580 A1* | 7/2017 | Dimnaku ............ G06F 16/285 |
| 2017/0293429 A1 | 10/2017 | Karaje et al. |
| 2018/0067771 A1 | 3/2018 | Frandzel et al. |
| 2018/0067772 A1 | 3/2018 | Frandzel et al. |
| 2019/0235956 A1* | 8/2019 | Liu .................... G06F 11/1076 |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2018/048592 A1 | 3/2018 |

OTHER PUBLICATIONS

Tan et al: *VMCD: A Virtual Multi-Channel Disk I/O Scheduling Method for Virtual Machines,* IEEE Transactions On Services Computing, vol. 9, No. 6, Dec. 2015, pp. 982-995, IEEE Xplore Digital Library (online), XP055426967, USA, ISSN: 1939-1374, DOI: 10.1109/TSC.2015.2436388.

Paul Sweere, *Creating Storage Class Persistent Memory with NVDIMM,* Published in Aug. 2013, Flash Memory Summit 2013, <http://ww.flashmemorysummit.com/English/Collaterals/Proceedings/2013/20130814_T2_Sweere.pdf>, 22 pages.

PCMAG, *Storage Array Definition,* Published May 10, 2013.<http://web.archive.org/web/20130510121646/http://www.pcmag.com/encyclopedia/term/52091/storage-array>, 2 pages.

Google Search of "stprage array define" perofrmed by the Examiner on Nov. 4, 2015 for U.S. Appl. No. 14/725,278, Results limited to entries dated before 2012, 1 page.

Techopedia, *What is a disk array,* techopedia.com (online), Jan. 13, 2012, 1 page, URL: web.archive.org/web/20120113053358/http://www.techopedia.com/definition/1009/disk-array.

Webopedia, *What is a disk array,* webopedia.com (online), May 26, 2011, 2 pages, URL: web/archive.org/web/20110526081214/http://www.webopedia.com/TERM/D/disk_array.html.

Li et al., *Access Control for the Services Oriented Architecture,* Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing,* International Journal of Advanced Networking and Applications, col. 1, Issue 1, Aug. 2011, 10 pages, Eswar Publications, India.

Faith, *dictzip file format,* GitHub.com (online), accessed Jul. 28, 2015, 1 page, URL: github.com/fidlej/idzip.

Wikipedia, *Convergent Encryption,* Wikipedia.org (online), accessed Sep. 8, 2015, 2 pages, URL: en.wikipedia.org/wiki/Convergent_encryption.

Storer et al., *Secure Data Deduplication,* Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements,* ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture,* Microsoft (online), Oct. 2014, 53 pages, URL: hybrid.office.com/img/Security_Reference_Architecture.pdf.

Microsoft, *Hybrid Identity,* Microsoft (online), Apr. 2014, 36 pages, URL: www.aka.ms/HybridIdentityWp.

Microsoft, Hybrid Identity Management, Microsoft (online), Apr. 2014, 2 pages, URL: download.microsoft.com/download/E/A/E/EAE57CD1-A80B-423C-96BB-142FAAC630139/Hybrid_Identity_Datasheet.pdf.

Bellamy-McIntyre et al., *OpenID and the Enterprise: A Model-based Analysis of Single Sign-On Authentication,* 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

(56) References Cited

OTHER PUBLICATIONS

Kong, *Using PCI Express As the Primary System Interconnect in Multiroot Compute, Storage, Communications and Embedded Systems,* White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash,* 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2017/047129, dated Nov. 29, 2017, 11 pages.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

Storage System 1202

In Response To Detecting That A Measured Service Time For I/O Requests In A Storage System Is Failing To Meet A Target Service Time For The I/O Requests, Reduce An I/O Capacity Of The I/O Requests In The Storage System 1502

Determine That Reducing The I/O Capacity Of The I/O Requests To Meet To The Target Service Time Causes The I/O Capacity Of The I/O Requests To Cross A Threshold I/O Capacity For The Storage System 1504

In Response To Determining That The I/O Capacity Of The I/O Requests Has Crossed The Threshold I/O Capacity For The Storage System: 1506

Determine An Updated Service Time Based On The Measured Service Time For The I/O Requests In The Storage System 1508

Update The Target Service Time Based On The Updated Service Time 1510

Storage Device 1216 | Storage Device 1218 | Storage Device 1220 | W.B. Device 1222

FIG. 15

Storage System 1202

In Response To Detecting That A Measured Service Time For I/O Requests In A Storage System Is Failing To Meet A Target Service Time For The I/O Requests, Reduce An I/O Capacity Of The I/O Requests In The Storage System 1502

↓

Determine That Reducing The I/O Capacity Of The I/O Requests To Meet To The Target Service Time Causes The I/O Capacity Of The I/O Requests To Cross A Threshold I/O Capacity For The Storage System 1504

↓

In Response To Determining That The I/O Capacity Of The I/O Requests Has Crossed The Threshold I/O Capacity For The Storage System: 1506

> Determine An Updated Service Time Based On The Measured Service Time For The I/O Requests In The Storage System 1508
>
> ↓
>
> Update The Target Service Time Based On The Updated Service Time 1510

↓

In Response To Detecting That A Subsequently Measured Service Time For The I/O Requests In The Storage System Is Less Than The Target Service Time For The I/O Requests And That The I/O Capacity For The I/O Requests Is Above The Threshold I/O Capacity For The Storage System: 1602

> Determine A Restored Service Time Based On The Subsequently Measured Service Time For The I/O Requests In The Storage System 1604
>
> ↓
>
> Update The Target Service Time Based On The Restored Service Time 1606

Storage Device 1216 | Storage Device 1218 | Storage Device 1220 | W.B. Device 1222

FIG. 16

Storage System 1202

In Response To Detecting That A Measured Service Time For I/O Requests In A Storage System Is Failing To Meet A Target Service Time For The I/O Requests, Reduce An I/O Capacity Of The I/O Requests In The Storage System 1502

Determine That Reducing The I/O Capacity Of The I/O Requests To Meet To The Target Service Time Causes The I/O Capacity Of The I/O Requests To Cross A Threshold I/O Capacity For The Storage System 1504

Determine That Reducing The I/O Capacity Of The I/O Requests To Meet To The Target Service Time Causes The I/O Capacity Of The I/O Requests To Fall Below The Threshold I/O Capacity For The Storage System A Predetermined Number Of Times. 1702

In Response To Determining That The I/O Capacity Of The I/O Requests Has Crossed The Threshold I/O Capacity For The Storage System: 1506

Determine An Updated Service Time Based On The Measured Service Time For The I/O Requests In The Storage System 1508

Update The Target Service Time Based On The Updated Service Time 1510

Storage Device 1216 | Storage Device 1218 | Storage Device 1220 | W.B. Device 1222

ADAPTING TARGET SERVICE TIMES IN A STORAGE SYSTEM

CROSS-REFERENCE TO RELATED APPLICATIONS

This application is a continuation in part application of U.S. patent application Ser. No. 15/385,048, filed Dec. 20, 2016, which is a continuation of and claims priority to U.S. Pat. No. 10,146,585, issued Dec. 4, 2018, which claims the benefit of U.S. Provisional Patent Application Ser. No. 62/384,691, filed Sep. 7, 2016.

BRIEF DESCRIPTION OF DRAWINGS

FIG. 15 sets forth a flow chart illustrating an example method for adapting target service times in a storage system according to embodiments of the present disclosure.

FIG. 16 sets forth a flow chart illustrating an additional example method for adapting target service times in a storage system according to embodiments of the present disclosure.

FIG. 17 sets forth a flow chart illustrating an additional example method for adapting target service times in a storage system according to embodiments of the present disclosure.

DESCRIPTION OF EMBODIMENTS

Figure 1:
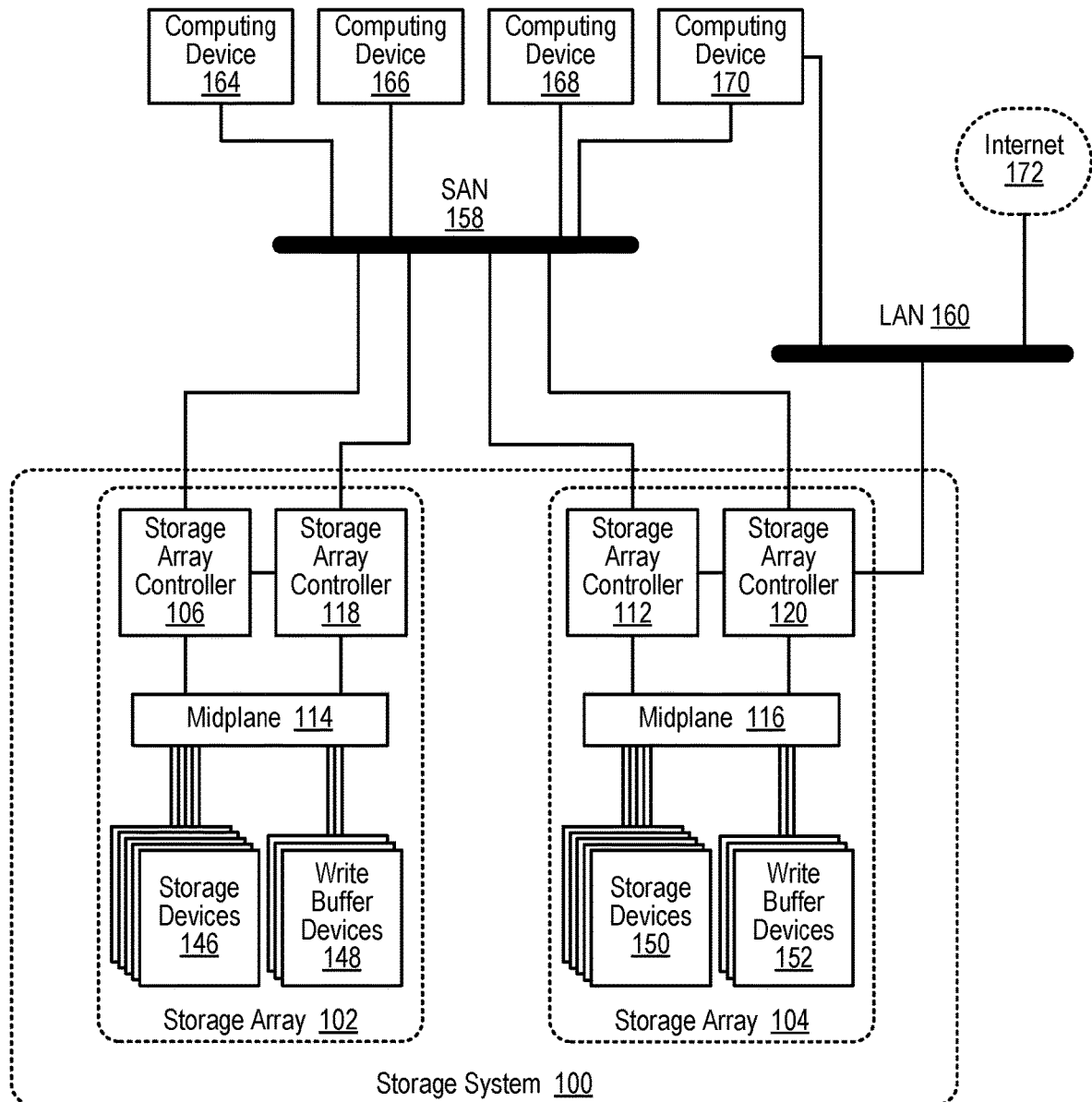
FIG. 1 sets forth a block diagram of a storage system configured for adapting target service times in a storage system according to embodiments of the present disclosure.

Example methods, apparatuses, and products for ensuring the fair utilization of system resources using workload based, time-independent scheduling and adapting target service times in a storage system in accordance with embodiments of the present disclosure are described with reference to the accompanying drawings, beginning with FIG. 1. FIG. 1 sets forth a block diagram of a storage system (100) configured for ensuring the fair utilization of system resources using workload based, time-independent scheduling and adapting target service times in a storage system according to embodiments of the present disclosure.

The storage system (100) depicted in FIG. 1 includes a plurality of storage arrays (102, 104), although ensuring the fair utilization of system resources using workload based, time-independent scheduling and adapting target service times in a storage system in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network (SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in ensuring the fair utilization of system resources using workload based, time-independent scheduling according to embodiments of the present disclosure. The storage array controllers (106, 112) may assist in ensuring the fair utilization of system resources using workload based, time-independent scheduling by: determining whether an amount of available system resources in the storage system has reached a predetermined reservation threshold; responsive to determining that the amount of available system resources in the storage system has reached the predetermined reservation threshold: determining whether one or more entities in the storage system have utilized system resources in excess of their fair share by a predetermined threshold during one or more time-independent periods; and responsive to determining that one or more entities in the storage system have utilized system resources in excess of their fair share by the predetermined threshold during the time-independent period, limiting the one or more entities from issuing additional I/O requests to the storage system; blocking the one or more entities from issuing additional I/O requests to the storage system; determining an amount of I/O operations that may be processed by the storage system in parallel; establishing, in dependence upon the amount of I/O operations that may be processed by the storage system in parallel, the time-independent period; determining the amount of I/O operations that may be processed by the storage system in parallel while adhering to a performance requirement; determining whether an additional time-independent period has expired since the one or more entities were limited from issuing additional I/O requests to the storage system; responsive to determining that the additional time-independent period has expired since the one or more entities were blocked from issuing additional I/O requests to the storage system, crediting the one or more entities with at least a portion of its fair share of system resources; determining whether the amount of available system resources in the storage system has become larger than the predetermined reservation threshold; responsive to determining that the amount of available system resources in the storage system has become larger than the predetermined reservation threshold, enabling the one or more entities to issue additional I/O requests to the storage system; determining, in dependence upon the amount of I/O operations that may be processed by the storage system in parallel, a fair share of system resources for each entity, and performing other functions as will be described in greater detail below.

The storage array controllers (106, 112) of FIG. 1 may be useful in adapting target service times in a storage system according to embodiments of the present disclosure. The storage array controllers (106, 112) may assist in adapting target service times in a storage system by: in response to detecting that a measured service time for I/O requests in a storage system is failing to meet a target service time for the I/O requests, reducing an I/O capacity of the I/O requests in the storage system; determining that reducing the I/O capacity of the I/O requests to meet to the target service time causes the I/O capacity of the I/O requests to cross a threshold I/O capacity for the storage system; and in response to determining that the I/O capacity of the I/O requests has crossed the threshold I/O capacity for the storage system: determining an updated service time based on the measured service time for the I/O requests in the storage system; and updating the target service time based on the updated service time.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Ensuring the fair utilization of system resources using workload based, time-independent scheduling and adapting target service times in a storage system in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in [PREAMBLE1] and [PREAMBLE2] according to embodiments of the present disclosure.

Figure 2:
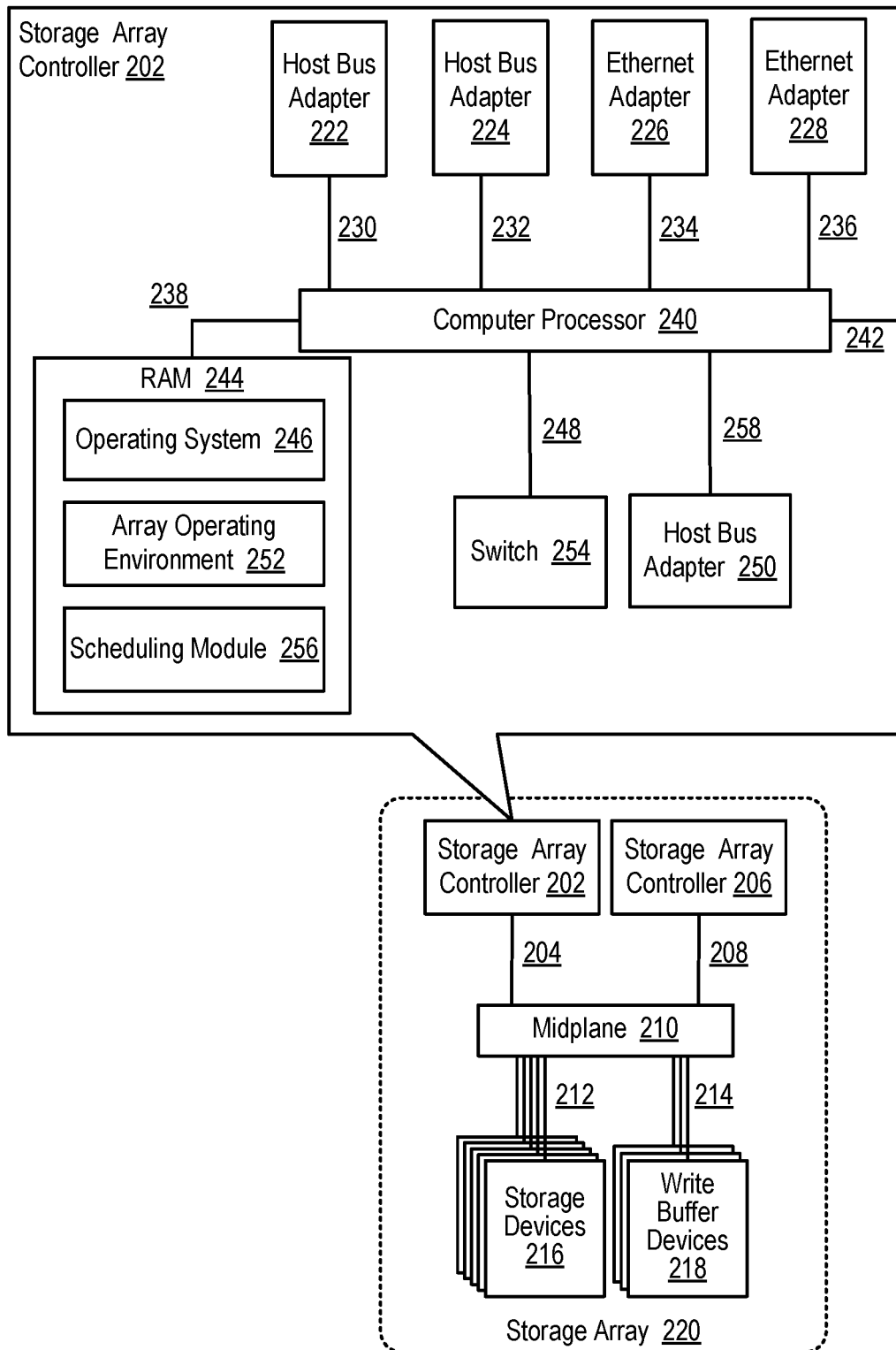
FIG. 2 sets forth a block diagram of a storage array controller useful in adapting target service times in a storage system according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI (SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in ensuring the fair utilization of system resources using workload based, time-independent scheduling and adapting target service times in a storage system according to embodiments of the present disclosure may include additional computer processors. Likewise, although the storage array controller (202) detailed in FIG. 2 includes only a RAM (244), readers will appreciate that storage array controllers useful in adapting target service times in a storage system according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for ensuring the fair utilization of system resources using workload based, time-independent scheduling and adapting target service times in a storage system according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a scheduling module (256), a module that includes computer program instructions useful in ensuring the fair utilization of system resources using workload based, time-independent scheduling according to embodiments of the present disclosure. The scheduling module (256) may be in ensuring the fair utilization of system resources using workload based, time-independent scheduling according to embodiments of the present disclosure by: determining whether an amount of available system resources in the storage system has reached a predetermined reservation threshold; responsive to determining that the amount of available system resources in the storage system has reached the predetermined reservation threshold: determining whether one or more entities in the storage system have utilized system resources in excess of their fair share by a predetermined threshold during one or more time-independent periods; and responsive to determining that one or more entities in the storage system have utilized system resources in excess of their fair share by the predetermined threshold during the time-independent period, limiting the one or more entities from issuing additional I/O requests to the storage system; blocking the one or more entities from issuing additional I/O requests to the storage system; determining an amount of I/O operations that may be processed by the storage system in parallel; establishing, in dependence upon the amount of I/O operations that may be processed by the storage system in parallel, the time-independent period; determining the amount of I/O operations that may be processed by the storage system in parallel while adhering to a performance requirement; determining whether an additional time-independent period has expired since the one or more entities were limited from issuing additional I/O requests to the storage system; responsive to determining that the additional time-independent period has expired since the one or more entities were blocked from issuing additional I/O requests to the storage system, crediting the one or more entities with at least a portion of its fair share of system resources; determining whether the amount of available system resources in the storage system has become larger than the predetermined reservation threshold; responsive to determining that the amount of available system resources in the storage system has become larger than the predetermined reservation threshold, enabling the one or more entities to issue additional I/O requests to the storage system; determining, in dependence upon the amount of I/O operations that may be processed by the storage system in parallel, a fair share of system resources for each entity, and performing other functions as will be described in greater detail below.

The storage array controller (202) detailed in FIG. 2 also includes a scheduling module (256), a module that includes computer program instructions useful in adapting target service times in a storage system according to embodiments of the present disclosure. The scheduling module (256) may be in adapting target service times in a storage system according to embodiments of the present disclosure by: in response to detecting that a measured service time for I/O requests in a storage system is failing to meet a target service time for the I/O requests, reducing an I/O capacity of the I/O requests in the storage system; determining that reducing the I/O capacity of the I/O requests to meet to the target service time causes the I/O capacity of the I/O requests to cross a threshold I/O capacity for the storage system; and in response to determining that the I/O capacity of the I/O requests has crossed the threshold I/O capacity for the storage system: determining an updated service time based on the measured service time for the I/O requests in the storage system; and updating the target service time based on the updated service time.

The storage array controller (202) detailed in FIG. 2 also includes a plurality of host bus adapters (222, 224, 250) that are coupled to the computer processor (240) via a data communications link (230, 232, 258). Each host bus adapter (222, 224, 250) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as a Target Channel Adapter, as a SCSI/Storage Target Adapter, and so on. The storage array controller (202) depicted in FIG. 2 also includes a plurality of Ethernet adapters (226, 228) that enables the storage array controller (202) to connect to a LAN or other data communications network. Each of the host bus adapters (222, 224, 250) and the Ethernet adapters (226, 228) may be coupled to the computer processor (240) via a data communications link (230, 232, 234, 236, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on. Readers will recognize that these components, protocols, adapters, and architectures are for illustration only, not limitation. Such a storage array controller may be implemented in a variety of different ways, each of which is well within the scope of the present disclosure.

Figure 3:
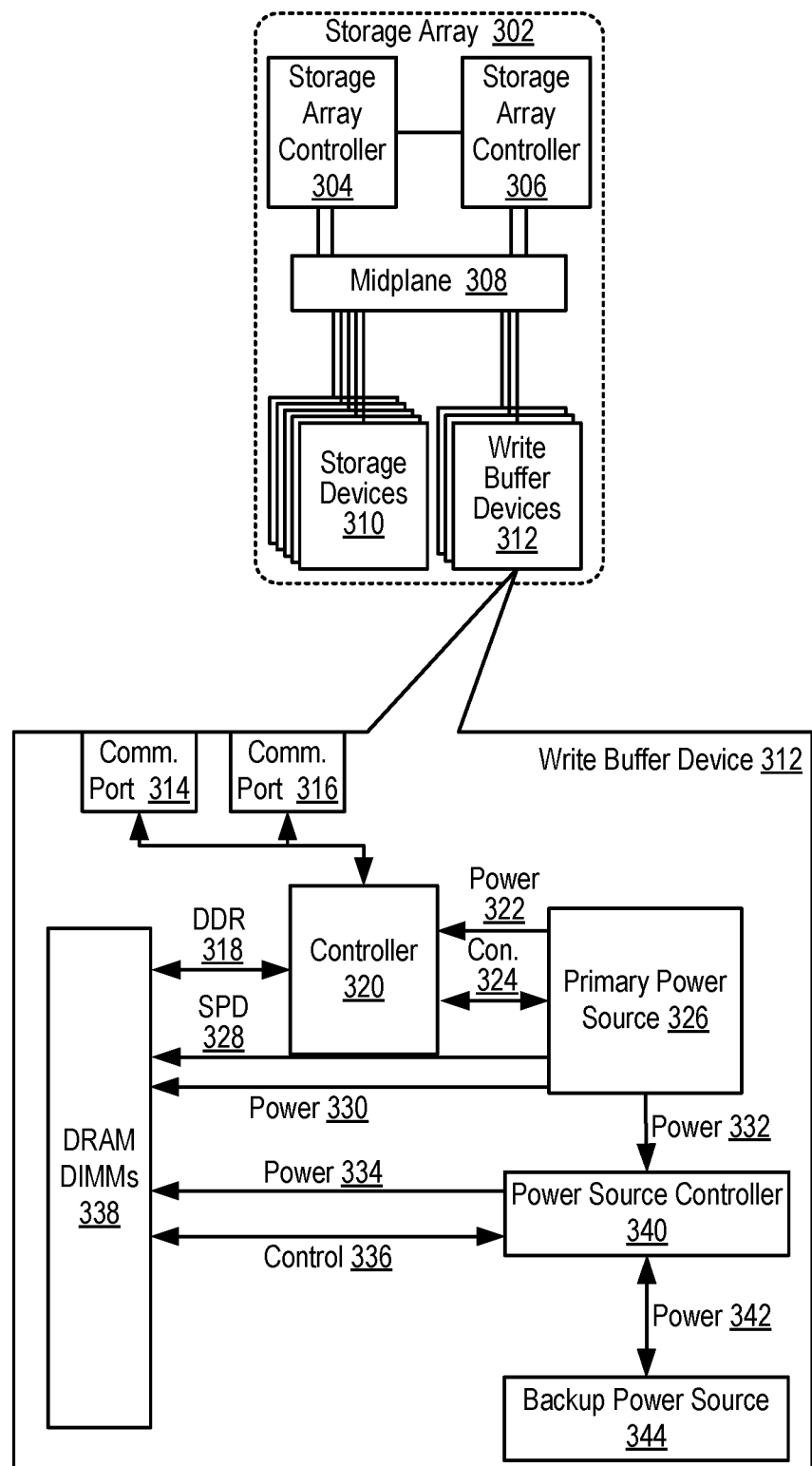
FIG. 3 sets forth a block diagram of a storage system configured for adapting target service times in a storage system according to embodiments of the present disclosure.

For further explanation, FIG. 3 sets forth a block diagram illustrating a write buffer device (312) useful in ensuring the fair utilization of system resources using workload based, time-independent scheduling and adapting target service times in a storage system according to embodiments of the present disclosure. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current (DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Although the preceding paragraphs describe storage systems and many of the hardware components and software components contained therein, readers will appreciate that ensuring the fair utilization of system resources using workload based, time-independent scheduling and adapting target service times in a storage system may be carried out in other types of storage systems that include different hardware components and different software components. In fact, ensuring the fair utilization of system resources using workload based, time-independent scheduling and adapting target service times in a storage system may be carried out in in any storage system that includes any form of limited resources, whether the limited resources are in the form of computing resources, storage resources, network bandwidth resources, other resources, or any combination thereof. For example, ensuring the fair utilization of system resources using workload based, time-independent scheduling and adapting target service times in a storage system may be carried out in a storage system that includes a plurality of blades, where each blade can include processing resources such as one or more computer processors, storage resources such as one or more storage devices, or any combination thereof.

Figure 4:
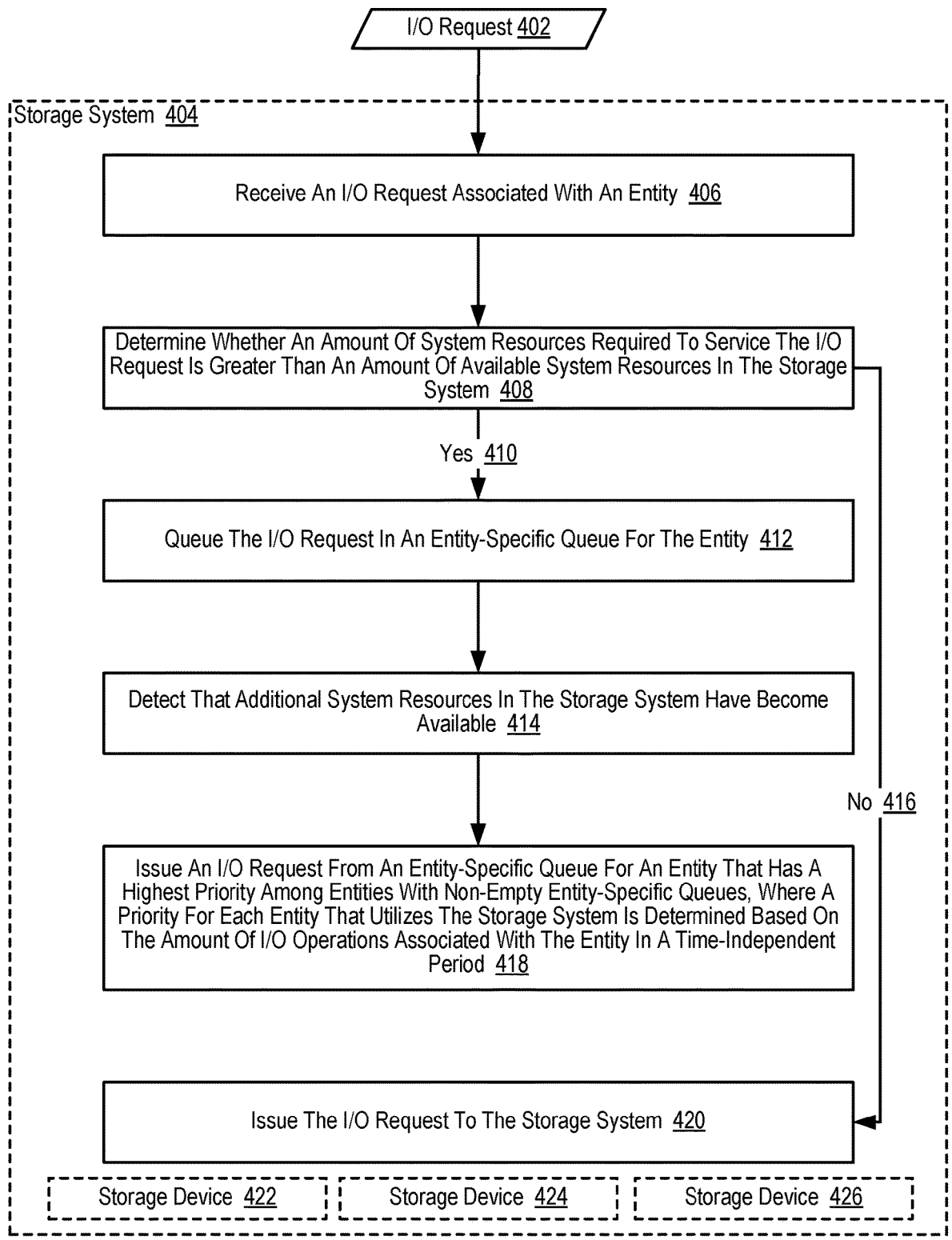
FIG. 4 sets forth a flow chart illustrating an example method for ensuring the fair utilization of system resources using workload based, time-independent scheduling according to embodiments of the present disclosure.

For further explanation, FIG. 4 sets forth a flow chart illustrating an example method for ensuring the fair utilization of system resources using workload based, time-independent scheduling according to embodiments of the present disclosure. The example method depicted in FIG. 4 may be carried out, for example, by a scheduling module as described above with reference to FIG. 2. The scheduling module may be executing on computer hardware within a storage system (404) that, although depicted in less detail in FIG. 4, may be similar to the storage systems described above with reference to FIGS. 1-3 as the storage system (404) can include storage devices (422, 424, 426) as well as many of the other components described in the previous figures.

The example method depicted in FIG. 4 includes receiving (406) an I/O request (402) associated with an entity. The I/O request (402) may be received (406), for example, via a SAN that connects users of the storage system (404) to the storage system (404). In such an example, the I/O request (406) may be associated with a particular entity such as, for example, a particular user of the storage system (404), a particular user-visible entity such as a volume that is supported by the storage system (404), a particular system-visible entity such as a medium that is supported by the storage system (404), or any other entity that may be associated with an I/O request (402). The I/O request (402) that is received (406) may be embodied, for example, as a request to write data to the storage system (404), as a request to read data from the storage system (404), or as another type of I/O request.

The example method depicted in FIG. 4 also includes determining (408) whether an amount of system resources required to service the I/O request (402) is greater than an amount of available system resources in the storage system (404). The amount of system resources required to service the I/O request (402) may be expressed, for example, in terms of the amount of processing resources required to service the I/O request (402), in terms of the amount of storage capacity required to service the I/O request (402), in terms of the amount of network bandwidth required to service the I/O request (402), or in other quantifiable terms. Readers will appreciate that the amount of system resources required to service the I/O request (402) may also be expressed in terms such as a unit of I/O requests that is established by a system administrator, established by a scheduling module as described above with reference to FIG. 2, or established by some other entity. A unit of I/O requests may be used in a debit/credit system that will be described in greater detail below and may be representative of the cumulative amount of system resources of many types (e.g., processing, network, storage) that are generally consumed when servicing different types of I/O requests. Consider an example in which the following table represents the amount of system resources required to service different types of I/O requests:

TABLE 1

Resource Consumption Table

| I/O Type | Resources Required to Service I/O |
|---|---|
| Read (64 KB or less) | 1 |
| Read (over 64 KB) | 2 |
| Write (64 KB or less) | 5 |
| Write (over 64 KB) | 10 |

In the resource consumption table included above, the amount of resources required to service various types of I/O requests are expressed units of I/O requests. The particular value associated with each type of I/O request may be determined, for example, by determining the number of I/O requests of each type that may be executed in parallel by the storage system (404) while meeting a predetermined performance threshold. For example, if all I/O requests should be serviced within a response time of 100 ms, through the use of testing operations it may be determined that the storage system (404) can execute ten times the number of read operations of 64 KB or less in parallel than the storage system (404) can execute write operations over 64 KB in size in parallel. As such, a write operation of over 64 KB in size required ten times more I/O requests to be performed than a read operation of 64 KB or less in terms of the amount of system resources required to service each type of I/O request.

Readers will appreciate that in the example method depicted in FIG. 4, the storage system (404) may not be able to service an unlimited number of I/O requests in parallel, especially while meeting the predetermined performance threshold. Through testing or observation of the actual operation of the storage system (404) it may be determined, for example, that the storage system (404) can execute 1000 read operations of 64 KB or less in parallel while meeting the predetermined performance threshold. Likewise, it may be determined that the storage system (404) can execute 100 write operations of over 64 KB in size in parallel while meeting the predetermined performance threshold. In such an example, using the resource consumption table included above, the storage system (404) would be able to execute 1000 units of I/O requests in parallel while meeting the predetermined performance threshold.

In the example method depicted in FIG. 4, the amount of available system resources in the storage system (404) may represent the portion of total system capacity that is not currently in use. Continuing with the example described above in which the storage system (404) would be able to execute 1000 units of I/O requests in parallel while meeting the predetermined performance threshold, assume that the storage system (404) is currently executing 100 read operations of 64 KB or less, 100 read operations of over 64 KB in size, 100 write operations of 64 KB or less, and 15 write operations of over 64 KB in size. Using the resource consumption table included above, the 100 read operations of 64 KB or less would consume 100 units of I/O requests, the 100 read operations of over 64 KB in size would consume 200 units of I/O requests, the 100 write operations of 64 KB or less would consume 500 units of I/O requests, and the 15 write operations of over 64 KB in size would consume 150 units of I/O requests. As such, the amount of available system resources in the storage system (404) would be 50 units of I/O requests, as 950 units of I/O requests are currently being consumed by the I/O requests currently executing on the storage system (404).

In the example method depicted in FIG. 4, determining (408) whether an amount of system resources required to service the I/O request (402) is greater than an amount of available system resources in the storage system (404) may be carried out, for example, by determining amount of system resources required to service the I/O request (402) from a resource such as the resource consumption table included above and comparing the amount of system resources required to service the I/O request (402) to the amount of available system resources in the storage system (404). In such an example, in response to determining that the amount of system resources required to service the I/O request is not (416) greater than the amount of available system resources in the storage system, the I/O request (402) may be issued (420) to the storage system (404) for immediate processing by the storage system (404). Readers will appreciate that all I/O requests (402) that are received may be issued (420) to the storage system (404) for immediate processing by the storage system (404) so long as the amount of system resources required to service the I/O request is not (416) greater than the amount of available system resources in the storage system.

The example method depicted in FIG. 4 also includes, responsive to affirmatively (410) determining that the amount of system resources required to service the I/O request (402) is greater than the amount of available system resources in the storage system (404), queueing (412) the I/O request (402) in an entity-specific queue for the entity that is associated with the I/O request (402). Readers will appreciate that issuing the I/O request (402) to the storage system (404) when the amount of system resources required to service the I/O request (402) is greater than the amount of available system resources in the storage system (404) may cause overall system performance to degrade, and as such, the I/O request (402) should be queued until sufficient system resources are available to service the I/O request (402). In the example method depicted in FIG. 4, the I/O request (402) may be queued (412) in an entity-specific queue for the entity that is associated with the I/O request (402). Readers will appreciate that the storage system (404) may maintain an entity-specific queue for each entity that may be associated with I/O requests that are serviced by the storage system (404).

Consider an example in which the storage system (404) services I/O requests that are directed to one or ten volumes supported by the storage system (404). In such an example, the storage system (404) may maintain ten entity-specific queues, where a first entity-specific queue is used to store I/O requests directed to a first volume, a second entity-specific queue is used to store I/O requests directed to a second volume, a third entity-specific queue is used to store I/O requests directed to a third volume, and so on. In such an example, when an I/O request (402) is received that is associated with a particular entity, if the amount of system resources required to service the I/O request (402) is greater than the amount of available system resources in the storage system (404), the I/O request (402) will be queued (412) in the entity-specific queue for the entity that is associated with the I/O request (402).

The example method depicted in FIG. 4 also includes detecting (414) that additional system resources in the storage system (404) have become available. Detecting (414) that additional system resources in the storage system (404) have become available may be carried out, for example, by detecting that the storage system (404) has completed the execution of one or more I/O requests. In such an example, the amount of system resources within the storage system (404) that have become available may be a function of the type and number of I/O requests whose execution has completed.

Consider the example described above in which the storage system (404) is able to execute 1000 units of I/O requests in parallel while meeting the predetermined performance threshold. In such an example, assume that 100 read operations of 64 KB or less, 100 read operations of over 64 KB in size, 100 write operations of 64 KB or less, and 15 write operations of over 64 KB in size are issued for execution by the storage system (404). In such an example, using the resource consumption table included above, the amount of available system resources in the storage system (404) would be 50 units of I/O requests. Further assume that execution of the 100 read operations of 64 KB or less subsequently completes, thereby indicating that additional system resources in the storage system (404) have become available. In such an example, using the resource consumption table included above, the amount of additional system resources in the storage system (404) that have become available would be 100 units of I/O requests. Readers will appreciate that the storage system (404) may track the amount of available system resources in the storage system (404) by initially setting the amount of available system resources in the storage system (404) to a value that represents the entire I/O processing capacity of the storage system (404), debiting the value by the cost associated with an I/O request each time that an I/O request is issued to the storage system (404), and crediting the value by the cost associated with an I/O request each time that execution of a previously issued I/O request is completed.

The example method depicted in FIG. 4 also includes, responsive to detecting that additional system resources in the storage system (404) have become available, issuing (418) an I/O request from an entity-specific queue for an entity that has a highest priority among entities with non-empty entity-specific queues. Readers will appreciate that while the storage system (404) may maintain an entity-specific queue for each entity that is associated with I/O requests that are serviced by the storage system (404), some entity-specific queues may be empty as no I/O requests associated with a particular entity may be stored in the entity-specific queue that is associated with the particular entity. For those entities that have non-empty entity-specific queues, however, an I/O request may be issued (418) for servicing by the storage system (404) from the entity-specific queue for the entity that has a highest priority among entities with non-empty entity-specific queues in response to detecting that additional system resources in the storage system (404) have become available. Readers will appreciate that an I/O request may only be issued (418) for servicing by the storage system (404) from the entity-specific queue for the entity that has a highest priority among entities with non-empty entity-specific queues, however, if the amount of available system resources in the storage system (404) is equal to or greater than the amount of system resources required to service such an I/O request.

In the example method depicted in FIG. 4, a priority for each entity that utilizes the storage system (404) is determined based on the amount of I/O requests issued by the entity in a time-independent period. The time-independent period may be embodied, for example, as one or more 'generations' of I/O requests, where each generation of I/O requests may be equal to the amount of I/O requests that the storage system (404) may execute in parallel while meeting a predetermined performance threshold. Consider the example described above in which the storage system (404)

can execute 1000 units of I/O requests in parallel while meeting the predetermined performance threshold. In such an example, a first generation of I/O requests may be defined as the first 1000 units of I/O requests executed by the storage system (404), a second generation of I/O requests may be defined as the second 1000 units of I/O requests executed by the storage system (404), and so on. Readers will appreciate that one or more generations of I/O requests is a time-independent period, as a generation of I/O requests may only cover a small period of time when the storage system (404) is receiving a relatively large number of I/O requests while another generation of I/O requests may cover a much larger period of time when the storage system (404) is receiving a relatively small number of I/O requests. Stated differently, different generations of I/O requests may span different lengths of time, thereby causing each period to be time-independent as two periods may cover different lengths of time. For example, a first generation of I/O requests may capture I/O requests issued in a 1 second time period while a second generation of I/O requests may capture I/O requests issued over a 100 ms time period.

In the example method depicted in FIG. 4, determining a priority for each entity that utilizes the storage system (404) based on the amount of I/O requests associated with the entity in a time-independent period may be carried out, for example, by assigning a highest priority to the entity that had the smallest amount of I/O requests associated with the entity during the time-independent period, by assigning a second highest priority to the entity that had the second smallest amount of I/O requests associated with the entity during the time-independent period, by assigning a third highest priority to the entity that had the third smallest amount of I/O requests associated with the entity during the time-independent period, and so on. In an alternative embodiment, only a predetermined number of priorities may exist and be assigned to each entity based on the amount of I/O requests associated with the entity in a time-independent period. For example, a lowest priority may be assigned to all entities that issued more than their fair share of I/O requests during the time-independent period and a highest priority may be assigned to all entities that did not issue more than their fair share of I/O requests during the time-independent period. Readers will appreciate that in embodiments where multiple entities share the same priority, issuing (418) an I/O request from an entity-specific queue for an entity that has a highest priority among entities with non-empty entity-specific queues may be carried out, for example, by issuing (418) I/O requests from an entity-specific queue for each of the entities that have a highest priority in a round robin fashion or in some other fashion.

Consider the example described above in which the storage system (404) can execute 1000 units of I/O requests in parallel while meeting the predetermined performance threshold. In such an example, assume that the time-independent period is defined including the most recent two generations of I/O requests serviced by the storage system (404), such that the time-independent period includes the most recent 2000 units of I/O requests performed by the storage system (404). In this example, further assume that the storage system (404) services I/O requests directed to three distinct volumes (volume 1, volume 2, and volume 3), where in the most recent two generations of I/O requests serviced by the storage system (404), 1200 units of I/O requests was directed to volume 1, 650 units of I/O requests was directed to volume 2, and 150 units of I/O requests was directed to volume 3. In such an example, a highest priority may be assigned to volume 3, a second highest priority may be assigned to volume 2, and a lowest priority may be assigned to volume 1. Readers will appreciate that by assigning priorities in such a way, the entity that is most responsible for the storage system (404) being in a state where the amount of system resources required to service the I/O request (402) is greater than the amount of available system resources in the storage system (404) will suffer the longest delays in processing its queued I/O requests as queued I/O requests for the other entities will be issued for processing by the storage system (404) first.

Figure 5:
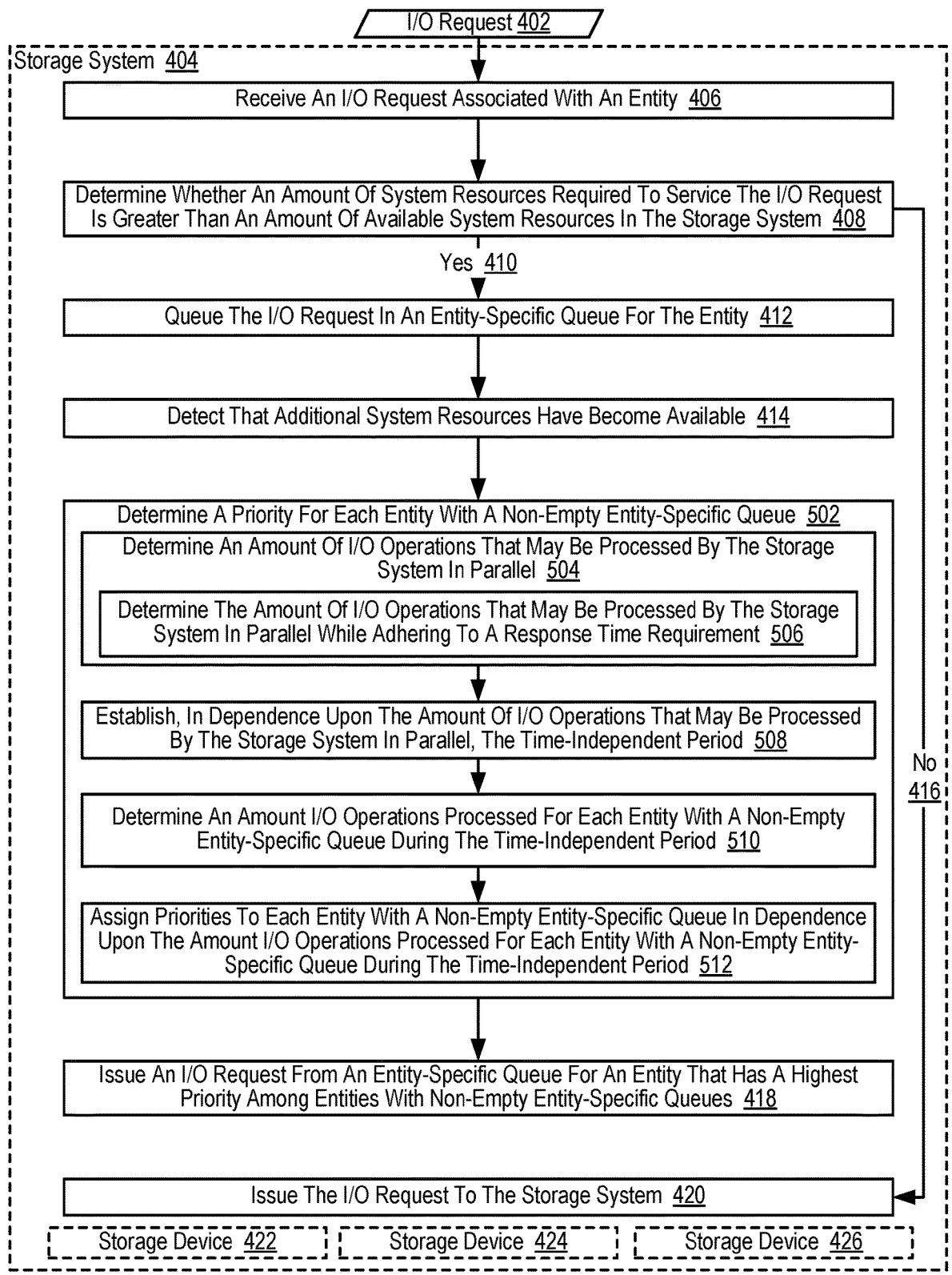
FIG. 5 sets forth a flow chart illustrating an additional example method for ensuring the fair utilization of system resources using workload based, time-independent scheduling according to embodiments of the present disclosure.

For further explanation, FIG. 5 sets forth a flow chart illustrating an additional example method for ensuring the fair utilization of system resources using workload based, time-independent scheduling according to embodiments of the present disclosure. The example method depicted in FIG. 5 is similar to the example method depicted in FIG. 4, as the example method depicted in FIG. 5 also includes receiving (406) an I/O request (402) associated with an entity, determining (408) whether an amount of system resources required to service the I/O request (402) is greater than an amount of available system resources in the storage system (404), issuing (420) the I/O request (402) to the storage system (404) in response to determining that the amount of system resources required to service the I/O request is not (416) greater than the amount of available system resources in the storage system (404), and in response to affirmatively (410) determining that the amount of system resources required to service the I/O request (402) is greater than the amount of available system resources in the storage system (404): queueing (412) the I/O request (402) in an entity-specific queue for the entity that is associated with the I/O request (402), detecting (414) that additional system resources in the storage system (404) have become available, and issuing (418) an I/O request from an entity-specific queue for an entity that has a highest priority among entities with non-empty entity-specific queues in response to detecting that additional system resources in the storage system (404) have become available.

The example method depicted in FIG. 5 also includes determining (502) a priority for each entity with a non-empty entity-specific queue. In the example method depicted in FIG. 5, determining (502) a priority for each entity with a non-empty entity-specific queue may be carried out, for example, by assigning a highest priority to the entity that had the smallest amount of I/O requests associated with the entity during the time-independent period, by assigning a second highest priority to the entity that had the second smallest amount of I/O requests associated with the entity during the time-independent period, by assigning a third highest priority to the entity that had the third smallest amount of I/O requests associated with the entity during the time-independent period, and so on. In an alternative embodiment, only a predetermined number of priorities may exist and be assigned to each entity based on the amount of I/O requests associated with the entity in a time-independent period. For example, a lowest priority may be assigned to all entities that issued more than their fair share of I/O requests during the time-independent period and a highest priority may be assigned to all entities that did not issue more than their fair share of I/O requests during the time-independent period.

In the example method depicted in FIG. 5, determining (502) a priority for each entity with a non-empty entity-specific queue can include determining (504) an amount of I/O requests that may be processed by the storage system (404) in parallel. Determining (504) an amount of I/O requests that may be processed by the storage system (404)

in parallel may be carried out, for example, through the use of one or more test suites that issue I/O requests to the storage system (404). Alternatively, determining (504) an amount of I/O requests that may be processed by the storage system (404) in parallel may be carried out by monitoring actual system performance during operation of the storage system (404) and identifying workload levels that cause system performance to degrade, as such a degradation in system performance may be indicative that system capacity has been fully utilized. In such an example, monitoring actual system performance during operation of the storage system (404) may be carried out indefinitely as amount of I/O requests that may be processed by the storage system (404) in parallel may change over time in response to components within the storage system (404) aging, in response to the storage system (404) storing more data, and for a variety of other reasons.

In the example method depicted in FIG. 5, determining (504) an amount of I/O requests that may be processed by the storage system (404) in parallel can include determining (506) the amount of I/O requests that may be processed by the storage system (404) in parallel while adhering to a response time requirement. Such a response time requirement may specify the maximum permissible amount of time that may lapse between the time that an I/O request is issued to the storage system (404) and the time that the storage system (404) indicates that the I/O request has been serviced. Readers will appreciate that in other embodiments, other or additional performance criteria may be taken into consideration as determining (504) an amount of I/O requests that may be processed by the storage system (404) in parallel can potentially include determining the amount of I/O requests that may be processed by the storage system (404) in parallel while adhering to a read latency requirement, determining the amount of I/O requests that may be processed by the storage system (404) in parallel while adhering to a write latency requirement, determining the amount of I/O requests that may be processed by the storage system (404) in parallel while adhering to an IOPS requirement, or determining the amount of I/O requests that may be processed by the storage system (404) in parallel while adhering to other requirements. In such an example, one or more of such performance criteria may be taken into consideration when determining (504) an amount of I/O requests that may be processed by the storage system (404) in parallel.

In the example method depicted in FIG. 5, determining (502) a priority for each entity with a non-empty entity-specific queue can also include establishing (508), in dependence upon the amount of I/O requests that may be processed by the storage system (404) in parallel, the time-independent period. Establishing (508), in dependence upon the amount of I/O requests that may be processed by the storage system (404) in parallel, the time-independent period may be carried out by establishing a time-independent period that includes one or more generations of I/O requests. In such an example, each generation of I/O requests may be equal to the amount of I/O requests that the storage system (404) may process in parallel. Consider the example described above in which the storage system (404) can execute 1000 units of I/O requests in parallel while meeting a predetermined performance threshold. In such an example, a first generation of I/O requests may be defined as the first 1000 units of I/O requests executed by the storage system (404), a second generation of I/O requests may be defined as the second 1000 units of I/O requests executed by the storage system (404), and so on. Readers will appreciate that one or more generations of I/O requests is a time-independent period, as a generation of I/O requests may only cover a small period of time when the storage system (404) is receiving a relatively large number of I/O requests while another generation of I/O requests may cover a much larger period of time when the storage system (404) is receiving a relatively small number of I/O requests. In the example method depicted in FIG. 5, the time-independent period can include an amount of most recently processed I/O requests that is equal to the amount of I/O requests that may be processed by the storage system in parallel, the time-independent period can include an amount of most recently processed I/O requests that is equal to an integer multiple of the amount of I/O requests that may be processed by the storage system in parallel, the time-independent period can include an amount of most recently processed I/O requests that is equal to an fractional portion of the amount of I/O requests that may be processed by the storage system in parallel, and so on.

In the example method depicted in FIG. 5, determining (502) a priority for each entity with a non-empty entity-specific queue can also include determining (510) an amount of I/O requests processed for each entity with a non-empty entity-specific queue during the time-independent period. Determining (510) the amount I/O requests processed for each entity with a non-empty entity-specific queue during the time-independent period may be carried out, for example, through the use of an I/O history maintained by one or more modules within the storage system. Such an I/O history may include information such as, a log of I/O requests issued for processing on the storage array along with an identifier of the entity that is associated with each I/O request, a log of I/O requests executed by the storage array along with an identifier of the entity that is associated with each I/O request, or other information. Readers will appreciate that the 'amount' I/O requests processed for each entity may be expressed in terms of the total cost associated with all I/O requests processed for each entity during the time-independent period. In such an example, the total cost associated with all I/O requests processed for each entity during the time-independent period may be calculated using information such as the resource consumption table described above. In such a way, all I/O requests are not treated equally as some types of I/O requests require more system resources to execute than other types of I/O requests.

Consider an example in which a first entity was associated with 25 read operations of 64 KB or less, 20 read operations of over 64 KB in size, 10 write operations of 64 KB or less, and 5 write operations of over 64 KB in size that were processed by the storage system (404) in the time-independent period. In such an example, the amount of I/O requests processed for the first entity during the time-independent period would be determined (510) to be 165 units of I/O requests. In such an example, if a second entity was associated with 20 write operations of over 64 KB in size that were processed by the storage system (404) in the time-independent period, the amount of I/O requests processed for the second entity during the time-independent period would be determined (510) to be 200 units of I/O requests, meaning that the amount of I/O requests processed for the second entity during the time-independent period would be greater than the amount of I/O requests processed for the first entity during the time-independent period, in spite of the fact that the number of I/O requests processed for the first entity during the time-independent period was greater than the number of I/O requests processed for the second entity during the time-independent period.

In the example method depicted in FIG. 5, determining (502) a priority for each entity with a non-empty entity-specific queue can also include assigning (512) priorities to each entity with a non-empty entity-specific queue in dependence upon the amount I/O requests processed for each entity with a non-empty entity-specific queue during the time-independent period. Assigning (512) priorities to each entity with a non-empty entity-specific queue in dependence upon the amount I/O requests processed for each entity with a non-empty entity-specific queue during the time-independent period may be carried out, for example, by assigning a highest priority to the entity that had the smallest amount of I/O requests associated with the entity that were processed during the time-independent period, by assigning a second highest priority to the entity that had the second smallest amount of I/O requests associated with the entity that were processed during the time-independent period, by assigning a third highest priority to the entity that had the third smallest amount of I/O requests associated with the entity that were processed during the time-independent period, and so on. In an alternative embodiment, only a predetermined number of priorities may exist and be assigned to each entity based on the amount of I/O requests associated with the entity that were processed in the time-independent period. For example, a lowest priority may be assigned to all entities that were associated with more than their fair share of I/O requests that were processed during the time-independent period and a highest priority may be assigned to all entities that were not associated with more than their fair share of I/O requests that were processed during the time-independent period.

Figure 6:
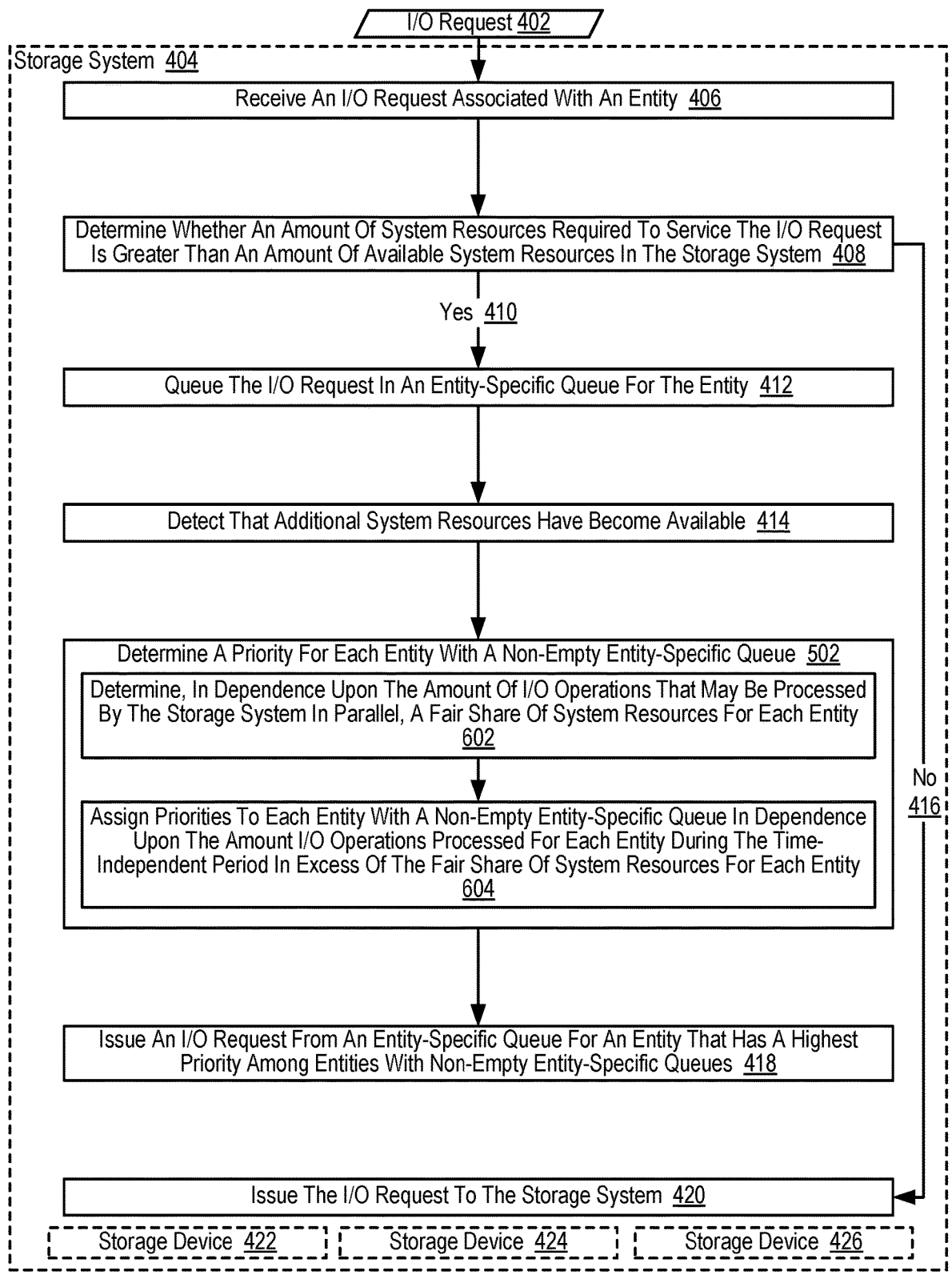
FIG. 6 sets forth a flow chart illustrating an additional example method for ensuring the fair utilization of system resources using workload based, time-independent scheduling according to embodiments of the present disclosure.

For further explanation, FIG. 6 sets forth a flow chart illustrating an additional example method for ensuring the fair utilization of system resources using workload based, time-independent scheduling according to embodiments of the present disclosure. The example method depicted in FIG. 6 is similar to the example methods depicted in FIG. 4 and FIG. 5, as the example method depicted in FIG. 5 also includes receiving (406) an I/O request (402) associated with an entity, determining (408) whether an amount of system resources required to service the I/O request (402) is greater than an amount of available system resources in the storage system (404), issuing (420) the I/O request (402) to the storage system (404) in response to determining that the amount of system resources required to service the I/O request is not (416) greater than the amount of available system resources in the storage system (404), and in response to affirmatively (410) determining that the amount of system resources required to service the I/O request (402) is greater than the amount of available system resources in the storage system (404): queueing (412) the I/O request (402) in an entity-specific queue for the entity that is associated with the I/O request (402), detecting (414) that additional system resources in the storage system (404) have become available, determining (502) a priority for each entity with a non-empty entity-specific queue, and issuing (418) an I/O request from an entity-specific queue for an entity that has a highest priority among entities with non-empty entity-specific queues in response to detecting that additional system resources in the storage system (404) have become available.

In the example method depicted in FIG. 6, determining (502) a priority for each entity with a non-empty entity-specific queue can include determining (602), in dependence upon the amount of I/O requests that may be processed by the storage system in parallel, a fair share of system resources for each entity. Determining (602) a fair share of system resources for each entity in dependence upon the amount of I/O requests that may be processed by the storage system (404) in parallel may be carried out, for example, by determining how many entities are actively associated with incoming I/O requests and dividing the amount of I/O requests that may be processed by the storage system (404) in parallel equally among the entities that are actively associated with incoming I/O requests. A particular entity may be deemed to be 'actively' associated with incoming I/O requests, for example, if any I/O requests that are associated with the particular entity have been received during a predetermined number of most recent I/O generations. Readers will appreciate that although FIG. 6 describes determining (602) a fair share of system resources for each entity in dependence upon the amount of I/O requests that may be processed by the storage system (404) in parallel, the fair share of system resources for each entity may be determined (602) in dependence upon the amount of I/O requests that may be processed by the storage system (404) in parallel while adhering to one or more performance criteria.

In the example method depicted in FIG. 6, determining (502) a priority for each entity with a non-empty entity-specific queue can also include assigning (604) priorities to each entity with a non-empty entity-specific queue in dependence upon the amount I/O requests processed for each entity during the time-independent period in excess of the fair share of system resources for each entity. Consider the example described above in which the storage system (404) can execute 1000 units of I/O requests in parallel while meeting a predetermined performance threshold. In such an example, assume that 10 entities are actively associated with incoming I/O requests. In this example, the fair share of system resources for each entity would be 100 units of I/O requests. If a particular entity was associated with 175 units of I/O requests that were processed during the time-independent period, the amount I/O requests processed for such an entity during the time-independent period in excess of the fair share of system resources for each entity would be 75 units of I/O requests. In the example method depicted in FIG. 6, assigning (604) priorities to each entity with a non-empty entity-specific queue in dependence upon the amount I/O requests processed for each entity during the time-independent period in excess of the fair share of system resources for each entity may be carried out, for example, by assigning the lowest priority to the entity that most significantly exceeded its fair share, by assigning the second lowest priority to the entity that exceeded its fair share by the second largest amount, and so on.

Readers will appreciate that the amount I/O requests processed for a particular entity during the time-independent period may be in excess of the fair share of system resources for such an entity because any incoming I/O request (402) will be issued (420) to the storage system (404) in response to determining that the amount of system resources required to service the I/O request is not (416) greater than the amount of available system resources in the storage system (404), regardless of which entity is associated with the I/O request. Consider the example described above in which ten entities are actively associated with incoming I/O requests. In such an example, the fair share of system resources for each entity would represent 10% of the storage system's (404) capacity for processing I/O requests. If nine of the entities have no pending I/O requests being serviced by the storage system (404) and the tenth entity issues an amount of I/O requests that would consume 25% of the storage system's (404) capacity for processing I/O requests, however, the storage system (404) may be configured to immediately process all of the I/O requests from the tenth entity because the storage system (404) has sufficient resources to immediately process all of the I/O requests from the tenth entity, in spite of the fact that the amount I/O requests processed for the tenth entity during the time-independent period may be in excess of the fair share of system resources for the tenth entity.

Figure 7:
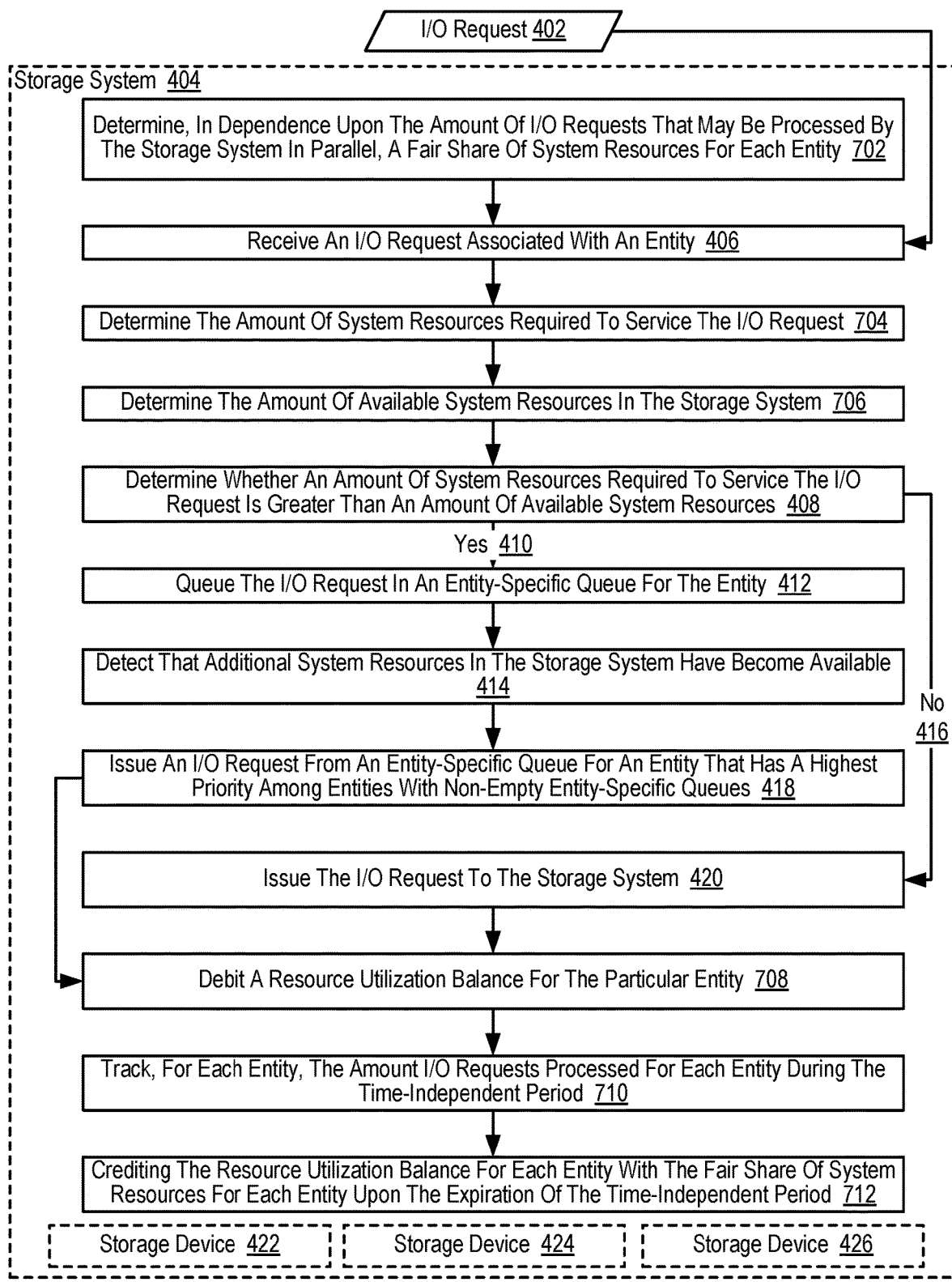
FIG. 7 sets forth a flow chart illustrating an additional example method for ensuring the fair utilization of system resources using workload based, time-independent scheduling according to embodiments of the present disclosure.

For further explanation, FIG. 7 sets forth a flow chart illustrating an additional example method for ensuring the fair utilization of system resources using workload based, time-independent scheduling according to embodiments of the present disclosure. The example method depicted in FIG. 7 is similar to the example methods depicted in FIG. 4, FIG. 5, and FIG. 6, as the example method depicted in FIG. 7 also includes receiving (406) an I/O request (402) associated with an entity, determining (408) whether an amount of system resources required to service the I/O request (402) is greater than an amount of available system resources in the storage system (404), issuing (420) the I/O request (402) to the storage system (404) in response to determining that the amount of system resources required to service the I/O request is not (416) greater than the amount of available system resources in the storage system (404), and in response to affirmatively (410) determining that the amount of system resources required to service the I/O request (402) is greater than the amount of available system resources in the storage system (404): queueing (412) the I/O request (402) in an entity-specific queue for the entity that is associated with the I/O request (402), detecting (414) that additional system resources in the storage system (404) have become available, and issuing (418) an I/O request from an entity-specific queue for an entity that has a highest priority among entities with non-empty entity-specific queues in response to detecting that additional system resources in the storage system (404) have become available.

The example method depicted in FIG. 7 also includes determining (702), in dependence upon the amount of I/O requests that may be processed by the storage system (404) in parallel, a fair share of system resources for each entity. Determining (702) a fair share of system resources for each entity in dependence upon the amount of I/O requests that may be processed by the storage system (404) in parallel may be carried out, for example, by determining how many entities are actively associated with incoming I/O requests and dividing the amount of I/O requests that may be processed by the storage system (404) in parallel equally among the entities that are actively associated with incoming I/O requests. A particular entity may be deemed to be 'actively' associated with incoming I/O requests, for example, if any I/O requests that are associated with the particular entity have been received during a predetermined number of I/O generations. Readers will appreciate that although FIG. 7 describes determining (702) a fair share of system resources for each entity in dependence upon the amount of I/O requests that may be processed by the storage system (404) in parallel, the fair share of system resources for each entity may be determined (702) in dependence upon the amount of I/O requests that may be processed by the storage system (404) in parallel while adhering to one or more performance criteria.

The example method depicted in FIG. 7 further comprises, in response to issuing the I/O request (402), debiting (708) a resource utilization balance for the entity associated with the I/O request (402). The resource utilization balance for the particular entity may represent a running total of the extent to which the particular entity has utilized its fair share of system resources. The resource utilization balance may initially be set to a value that includes the particular entity's fair share of system resources, and each time that the particular entity utilizes some system resources, the particular entity's resource utilization balance may be debited (708) by an amount that is equal to the amount of system resources that the particular entity consumed. Debiting (708) the resource utilization balance for the entity associated with the I/O request (402) may be carried out, for example, by subtracting the amount of system resources required to service the I/O request (402) from resource utilization balance for the entity that is associated with the I/O request (402). In such an example, by debiting (708) the resource utilization balance for the entity associated with the I/O request (402) in response to issuing the I/O request (402), the storage system (404) may track the extent to which each entity has utilized its fair share of system resources.

The example method depicted in FIG. 7 also includes tracking (710), for each entity, the amount I/O requests processed for each entity during the time-independent period. Tracking (710) the amount I/O requests processed for each entity during the time-independent period may be carried out, for example, by summing up the amount of resources required to service each I/O request issued by each entity during the time-independent period using information from a source such as the resource consumption table described above. Consider an example in which a first entity was associated with 25 read operations of 64 KB or less, 20 read operations of over 64 KB in size, 10 write operations of 64 KB or less, and 5 write operations of over 64 KB in size that were processed by the storage system (404) in the time-independent period. In such an example, the amount of I/O requests processed for the first entity during the time-independent period would be 165 units of I/O requests.

The example method depicted in FIG. 7 also includes crediting (712) the resource utilization balance for each entity with the fair share of system resources for each entity upon the expiration of the time-independent period. Readers will appreciate that by crediting (712) the resource utilization balance for each entity with the fair share of system resources for each entity upon the expiration of the time-independent period, rather than crediting the resource utilization balance for an entity associated with an I/O request when the I/O request completes, entities that use more than their fair share of system resources can be tracked such that entities that use more than their fair share of system resources may be given lower priority when system utilization reaches system capacity.

Consider the example described above in which the storage system (404) can execute 1000 units of I/O requests in parallel while meeting a predetermined performance threshold, 10 entities are actively associated with incoming I/O requests, such that the fair share of system resources for each entity would be 100 units of I/O requests. In such an example, assume that in the current time-independent period, a first entity causes 900 units of I/O requests issued, resulting in the storage system (404) hitting its full capacity and further resulting in the queueing of I/O requests. In such an example, because the resource utilization balance for the first entity is debited (708) as each I/O request is issued, the first entity would quickly develop a negative resource utilization balance, thereby identifying the first entity as an entity that has utilized system resources in excess of its fair share. As the execution of such I/O requests completes, if the resource utilization balance for the first entity were to be credited with the amount of system resources required to service each I/O request as each I/O request completes, the first entity would quickly return to a state where it has a non-negative resource utilization balance and it is not characterized as having utilized system resources in excess of its fair share, in spite of the fact that the performance of I/O requests associated with other entities suffered in large part because the first entity issued such a large amount of I/O requests. Rather than creating a situation where an entity can quickly be absolved of such resource overutilization, by only crediting (712) the resource utilization balance for each entity with the fair share of system resources for each entity upon the expiration of the time-independent period, the entity must cease over utilizing system resources in order to return to a state where it is not characterized as having utilized system resources in excess of its fair share.

The example method depicted in FIG. 7 also includes determining (704) the amount of system resources required to service the I/O request (402). Determining (704) the amount of system resources required to service the I/O request (402) may be carried out, for example, through the use of a resource consumption table or other information source that associates various types of I/O requests with the amount of system resources required to service each type of I/O request. The resource consumption table or other information source that associates various types of I/O requests with the amount of system resources required to service each type of I/O request may be generated, for example, through the use of a test suite, by observing and analyzing actual system performance over the lifespan of the storage system (404), or in other ways.

The example method depicted in FIG. 7 also includes determining (706) the amount of available system resources in the storage system (404). The amount of available system resources in the storage system (404) may represent the portion of total system capacity that is not currently in use. Continuing with the example described above in which the storage system (404) would be able to execute 1000 units of I/O requests in parallel while meeting the predetermined performance threshold, assume that the storage system (404) is currently executing 100 read operations of 64 KB or less, 100 read operations of over 64 KB in size, 100 write operations of 64 KB or less, and 15 write operations of over 64 KB in size. Using the resource consumption table included above, the 100 read operations of 64 KB or less would consume 100 units of I/O requests, the 100 read operations of over 64 KB in size would consume 200 units of I/O requests, the 100 write operations of 64 KB or less would consume 500 units of I/O requests, and the 15 write operations of over 64 KB in size would consume 150 units of I/O requests. As such, the amount of available system resources in the storage system (404) would be 50 units of I/O requests, as 950 units of I/O requests are currently being consumed by the I/O requests currently executing on the storage system (404). In the example method depicted in FIG. 7, determining (706) the amount of available system resources in the storage system (404) may be carried out, for example, by initially setting the amount of available system resources in the storage system (404) to a value that represents the amount of I/O requests that the storage can process in parallel (possibly even while adhering to one or more performance criteria). Each time an I/O request is issued for servicing by the storage system (404), the amount of available system resources in the storage system (404) may be debited by an amount that is equal to the amount of system resources required to service the I/O request. Likewise, each time the storage system (404) finishes servicing an I/O request, the amount of available system resources in the storage system (404) may be credited by an amount that is equal to the amount of system resources required to service the I/O request.

Figure 8:
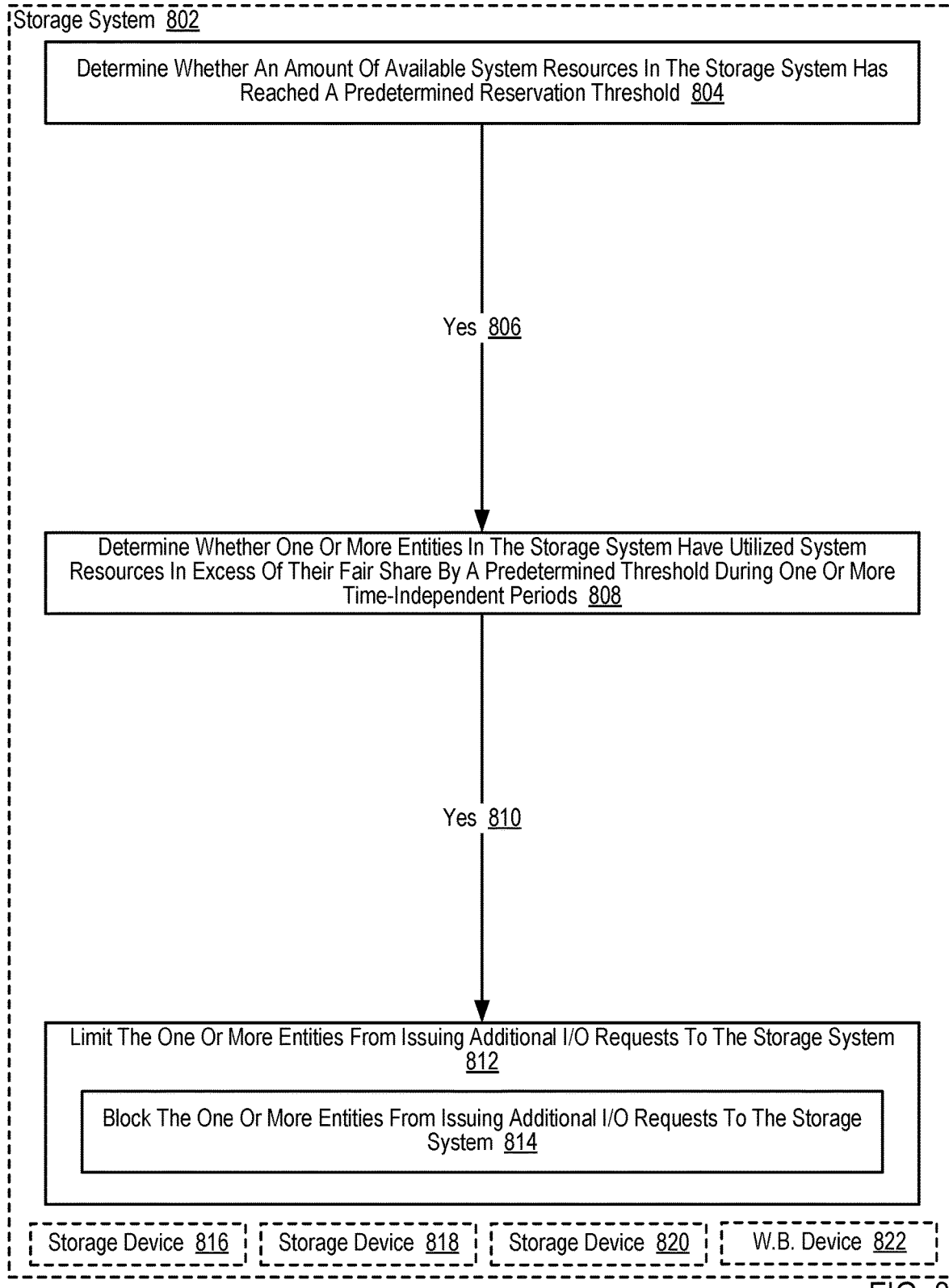
FIG. 8 sets forth a flow chart illustrating an additional example method for ensuring the fair utilization of system resources using workload based, time-independent scheduling according to embodiments of the present disclosure.

For further explanation, FIG. 8 sets forth a flow chart illustrating an additional example method for ensuring the fair utilization of system resources using workload based, time-independent scheduling according to embodiments of the present disclosure. The example method depicted in FIG. 8 may be carried out, for example, by a scheduling module as described above with reference to FIG. 2. The scheduling module may be executing on computer hardware within a storage system (802) that, although depicted in less detail in FIG. 8, may be similar to the storage systems described above with reference to FIGS. 1-3.

The example method depicted in FIG. 8 includes determining (802) whether an amount of available system resources in the storage system (802) has reached a predetermined reservation threshold. The predetermined reservation threshold can represent an amount of system resources whose usage should be restricted, so that some portion of the system resource generally remains available. Consider an example in which a system resource such a write buffer device (822), as described above with reference to FIG. 1, is associated with a predetermined reservation threshold of 10%. As described above, such a write buffer device (822) may be utilized as a quickly accessible buffer for data destined to be written to one or the storage devices (816, 818, 820) in the storage system (802). By utilizing the write buffer device (822) in such a way, the write latency experienced by users of the storage system (802) may be significantly improved relative to storage systems that do not include such write buffer devices (822). The write latency experienced by users of the storage system (802) may be significantly improved relative to storage systems that do not include such a write buffer device (802) because a storage array controller may send an acknowledgment to the user of the storage system (802) indicating that a write request has been serviced once the data associated with the write request has been written to one or the write buffer devices (822), even if the data associated with the write request has not yet been written to any of the storage devices (816, 818, 820). Readers will appreciate that if the write buffer device (822) becomes completely full, system performance may suffer significantly. As such, it may be prudent to restrict access to some portion of the write buffer device (822) through the use of a predetermined reservation threshold.

In the example method depicted in FIG. 8, determining (802) whether an amount of available system resources in the storage system (802) has reached a predetermined reservation threshold may be carried out, for example, by comparing the total amount a particular system resource that exists in the storage system (802) to the total amount the particular system resource that is currently available, by comparing the total amount a particular system resource that exists in the storage system (802) to the total amount the particular system resource that is currently in use, or in other ways. Continuing with the example in which a system resource such a write buffer device (822) is associated with a predetermined reservation threshold of 10%, if the total capacity of the write buffer device (822) is 1 TB and the amount of free space in the write buffer device is 100 GB, the amount of available write buffer (822) resources in the storage system (802) has reached the predetermined reservation threshold.

The example method depicted in FIG. 8 also includes, in response to affirmatively (806) determining that the amount of available system resources in the storage system (802) has reached the predetermined reservation threshold, determining (808) whether one or more entities in the storage system (802) have utilized system resources in excess of their fair share by a predetermined threshold during one or more time-independent periods. In the example method depicted in FIG. 8, the fair share of a particular system resource for each entity that is associated with incoming I/O requests may be determined by dividing the total amount of the particular system resource that is in the storage system (802) by the number of entities that are actively associated with I/O requests that are being serviced by the storage system (802). Continuing with the example described above in which a system resource such a write buffer device (822) has a total capacity of 1 TB, if there are 10 entities that are actively associated with I/O requests that are being serviced by the storage system (802), the fair share of write buffer device (822) resources for each entity is 100 GB.

In the example method depicted in FIG. 8, determining (808) whether one or more entities in the storage system (802) have utilized system resources in excess of their fair share by a predetermined threshold during one or more time-independent periods may be carried out, for example, by comparing the amount of a particular system resource that is utilized by each entity to the fair share of such a resource for each entity. Continuing with the example described above in which a system resource such a write buffer device (822) has a total capacity of 1 TB, there are 10 entities that are actively associated with I/O requests that are being serviced by the storage system (802), and the fair share of write buffer device (822) resources for each entity is 100 GB, assume that 150 GB of the data stored on the write buffer device (822) is attributable to a first entity. In such an example, the first entity has utilized more than its fair share of the write buffer device (822) resources available in the storage system (802). In such an example, determining (808) whether one or more entities in the storage system (802) have utilized system resources in excess of their fair share by a predetermined threshold during one or more time-independent periods may be carried out by comparing the amount of system resources that a particular entity utilized in excess of its fair share to the predetermined threshold. In some embodiments, the predetermined threshold may be set to a non-zero value to allow for some level of resource utilization in excess of an entity's fair share, and in other embodiments the predetermined threshold may be set of a value of zero.

The example method depicted in FIG. 8 also includes, in response to affirmatively (810) determining that one or more entities in the storage system (802) have utilized system resources in excess of their fair share by the predetermined threshold during the time-independent period, limiting (812) the one or more entities from issuing additional I/O requests to the storage system (802). In the example method depicted in FIG. 8, limiting (812) the one or more entities from issuing additional I/O requests to the storage system (802) may be carried out, for example, by reducing the amount of additional I/O requests associated with an entity that used more than its fair share of system resources that may be issued to the storage system (802). The one or more entities may be limited (812) from issuing additional I/O requests to the storage system (802), for example, until a resource utilization balance as described above is restored to an acceptable level through the use of a debiting and crediting system described above, until the amount of available system resources in the storage system (802) has fallen below the predetermined reservation threshold, or until the occurrence of some other event.

In the example method depicted in FIG. 8, limiting (812) the one or more entities from issuing additional I/O requests to the storage system (802) can include blocking (814) the one or more entities from issuing additional I/O requests to the storage system (802). By blocking (814) the one or more entities from issuing additional I/O requests to the storage system (802), the one or more entities that have utilized more than their fair share of system resources may be entirely prohibited from having any additional I/O requests associated with such an entity issued to the storage system (802). The one or more entities may be blocked (814) from issuing additional I/O requests to the storage system (802), for example, until a resource utilization balance as described above is restored to an acceptable level through the use of a debiting and crediting system described above, until the amount of available system resources in the storage system (802) has fallen below the predetermined reservation threshold, or until the occurrence of some other event.

Figure 9:
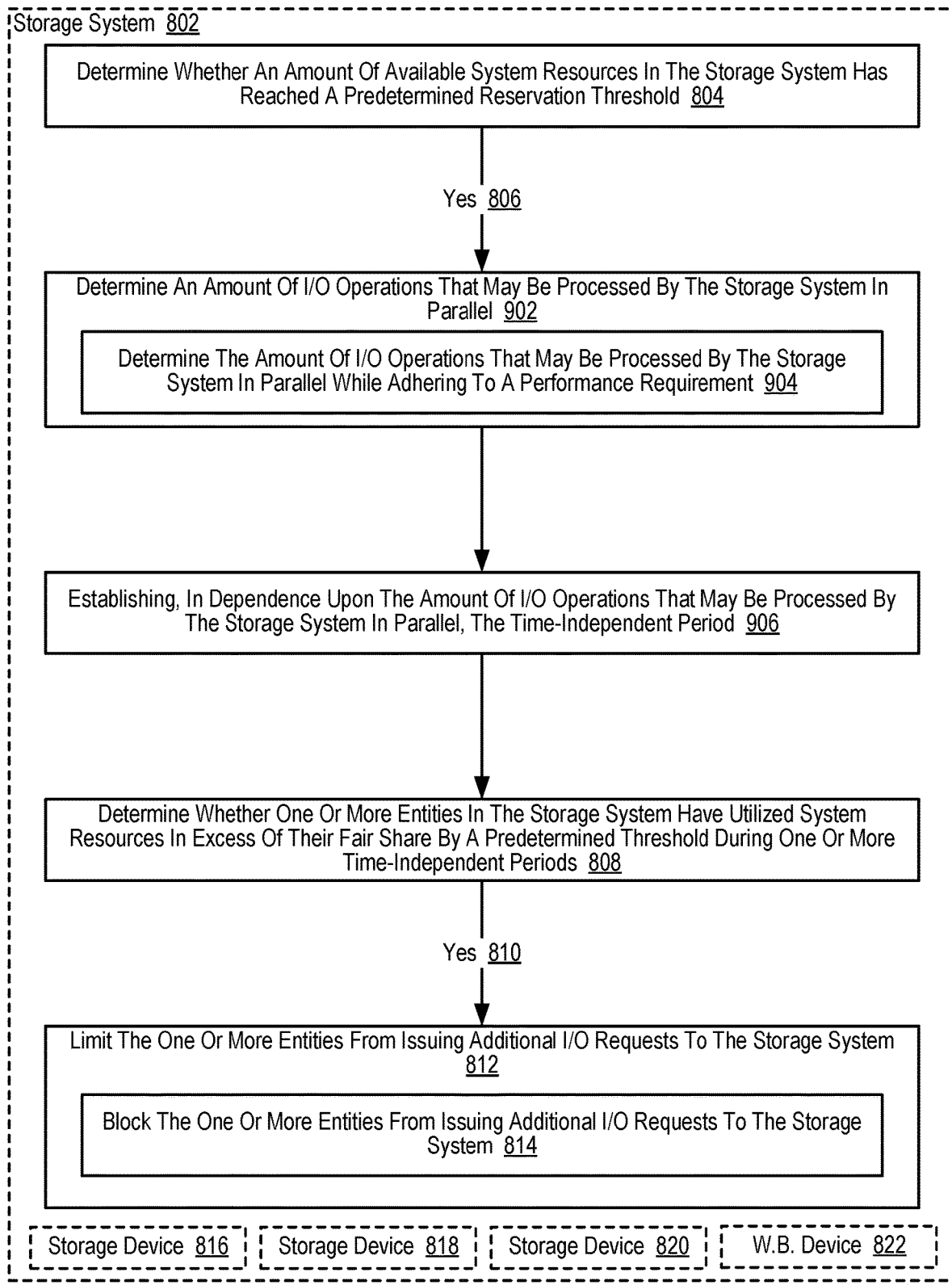
FIG. 9 sets forth a flow chart illustrating an additional example method for ensuring the fair utilization of system resources using workload based, time-independent scheduling according to embodiments of the present disclosure.

For further explanation, FIG. 9 sets forth a flow chart illustrating an additional example method for ensuring the fair utilization of system resources using workload based, time-independent scheduling according to embodiments of the present disclosure. The example method depicted in FIG. 9 is similar to the example method depicted in FIG. 8, as the example method depicted in FIG. 9 also includes determining (802) whether an amount of available system resources in the storage system (802) has reached a predetermined reservation threshold, determining (808) whether one or more entities in the storage system (802) have utilized system resources in excess of their fair share by a predetermined threshold during one or more time-independent periods, and limiting (812) the one or more entities from issuing additional I/O requests to the storage system (802).

The example method depicted in FIG. 9 also includes determining (902) an amount of I/O requests that may be processed by the storage system (802) in parallel. Determining (902) an amount of I/O requests that may be processed by the storage system (802) in parallel may be carried out, for example, through the use of one or more test suites that issue I/O requests to the storage system (802). Alternatively, determining (902) an amount of I/O requests that may be processed by the storage system (802) in parallel may be carried out by monitoring actual system performance during operation of the storage system (802) and identifying workload levels that cause system performance to degrade, as such a degradation in system performance may be indicative that system capacity has been fully utilized. In such an example, monitoring actual system performance during operation of the storage system (802) may be carried out indefinitely as amount of I/O requests that may be processed by the storage system (802) in parallel may change over time in response to components within the storage system (802) aging, in response to the storage system (802) storing more data, and for a variety of other reasons.

In the example method depicted in FIG. 9, determining (902) an amount of I/O requests that may be processed by the storage system (802) in parallel can include determining (904) the amount of I/O requests that may be processed by the storage system (802) in parallel while adhering to a performance requirement. Such a performance requirement may specify, for example, the maximum permissible amount of time that may lapse between the time that an I/O request is issued to the storage system (802) and the time that the storage system (802) indicates that the I/O request has been serviced. Readers will appreciate that in other embodiments, other or additional performance criteria may be taken into consideration as determining (904) an amount of I/O requests that may be processed by the storage system (802) in parallel while adhering to a performance requirement can potentially include determining the amount of I/O requests that may be processed by the storage system (802) in parallel while adhering to a read latency requirement, determining the amount of I/O requests that may be processed by the storage system (802) in parallel while adhering to a write latency requirement, determining the amount of I/O requests that may be processed by the storage system (802) in parallel while adhering to an IOPS requirement, or determining the amount of I/O requests that may be processed by the storage system (802) in parallel while adhering to other requirements. In such an example, one or more of such performance criteria may be taken into consideration when determining (904) an amount of I/O requests that may be processed by the storage system (802) in parallel while adhering to a performance requirement.

The example method depicted in FIG. 9 also includes establishing (906), in dependence upon the amount of I/O requests that may be processed by the storage system (802) in parallel, the time-independent period. Establishing (906), in dependence upon the amount of I/O requests that may be processed by the storage system (802) in parallel, the time-independent period may be carried out by establishing a time-independent period that includes one or more generations of I/O requests. In such an example, each generation of I/O requests may be equal to the amount of I/O requests that the storage system (802) may process in parallel. Consider the example described above in which the storage system (802) can execute 1000 units of I/O requests in parallel while meeting a predetermined performance threshold. In such an example, a first generation of I/O requests may be defined as the first 1000 units of I/O requests executed by the storage system (802), a second generation of I/O requests may be defined as the second 1000 units of I/O requests executed by the storage system (802), and so on. Readers will appreciate that one or more generations of I/O requests is a time-independent period, as a generation of I/O requests may only cover a small period of time when the storage system (802) is receiving a relatively large number of I/O requests while another generation of I/O requests may cover a much larger period of time when the storage system (802) is receiving a relatively small number of I/O requests. In the example method depicted in FIG. 9, the time-independent period can include an amount of most recently processed I/O requests that is a function of the amount of I/O requests that may be processed by the storage system (802) in parallel as the time-independent period can include an amount of most recently processed I/O requests that is equal to an integer multiple of the amount of I/O requests that may be processed by the storage system in parallel, the time-independent period can include an amount of most recently processed I/O requests that is equal to an fractional portion of the amount of I/O requests that may be processed by the storage system in parallel, and so on.

Figure 10:
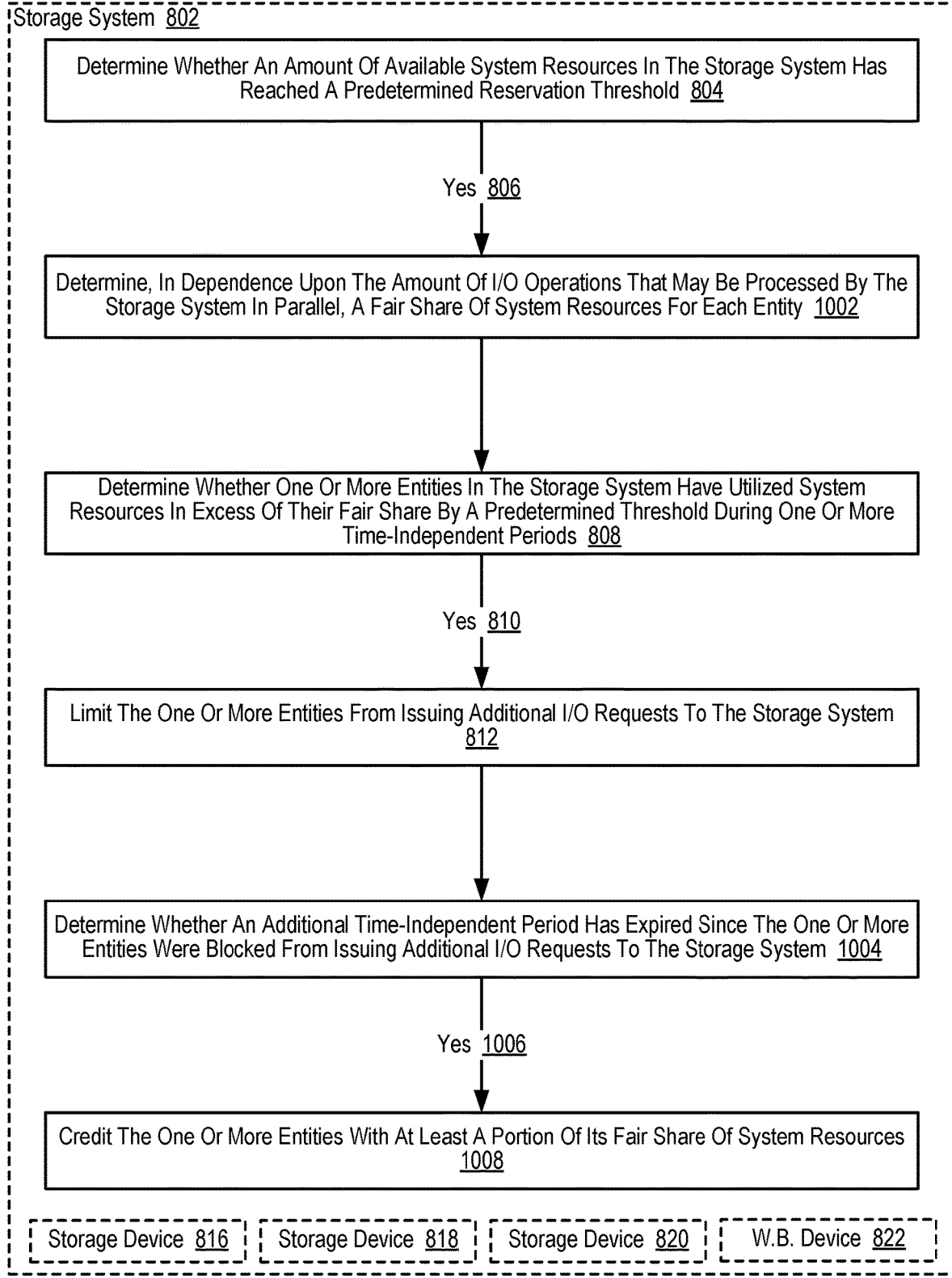
FIG. 10 sets forth a flow chart illustrating an additional example method for ensuring the fair utilization of system resources using workload based, time-independent scheduling according to embodiments of the present disclosure.

For further explanation, FIG. 10 sets forth a flow chart illustrating an additional example method for ensuring the fair utilization of system resources using workload based, time-independent scheduling according to embodiments of the present disclosure. The example method depicted in FIG. 10 is similar to the example method depicted in FIG. 8, as the example method depicted in FIG. 10 also includes determining (802) whether an amount of available system resources in the storage system (802) has reached a predetermined reservation threshold, determining (808) whether one or more entities in the storage system (802) have utilized system resources in excess of their fair share by a predetermined threshold during one or more time-independent periods, and limiting (812) the one or more entities from issuing additional I/O requests to the storage system (802).

The example method depicted in FIG. 10 also includes determining (1002), in dependence upon the amount of I/O requests that may be processed by the storage system (802) in parallel, a fair share of system resources for each entity. Determining (1002) a fair share of system resources for each entity in dependence upon the amount of I/O requests that may be processed by the storage system (802) in parallel may be carried out, for example, by determining how many entities are actively associated with incoming I/O requests and dividing the amount of I/O requests that may be processed by the storage system (802) in parallel equally among the entities that are actively associated with incoming I/O requests. A particular entity may be deemed to be 'actively' associated with incoming I/O requests, for example, if any I/O requests that are associated with the particular entity have been received during a predetermined number of most recent I/O generations. Readers will appreciate that although FIG. 10 describes determining (1002) a fair share of system resources for each entity in dependence upon the amount of I/O requests that may be processed by the storage system (802) in parallel, the fair share of system resources for each entity may be determined (1002) in dependence upon the amount of I/O requests that may be processed by the storage system (802) in parallel while adhering to one or more performance criteria.

The example method depicted in FIG. 10 also includes determining (1004) whether an additional time-independent period has expired since the one or more entities were limited from issuing additional I/O requests to the storage system (802). In the example method depicted in FIG. 10, determining (1004) whether an additional time-independent period has expired since the one or more entities were limited from issuing additional I/O requests to the storage system (802) may be carried out by tracking the amount of I/O requests that were issued since the one or more entities were limited from issuing additional I/O requests to the storage system (802). In an example in which the time-independent period is a function of the amount of I/O requests that are included in a generation of I/O requests, an additional time-independent period has expired once the amount of I/O requests that were issued since the one or more entities were limited from issuing additional I/O requests to the storage system (802) has reached the amount of the amount of I/O requests that are included in the time-independent period.

The example method depicted in in FIG. 10 also includes, in response to affirmatively (1006) determining that the additional time-independent period has expired since the one or more entities were blocked from issuing additional I/O requests to the storage system (802), crediting (1008) the one or more entities with at least a portion of its fair share of system resources. Crediting (1008) the one or more entities with at least a portion of its fair share of system resources may be carried out, for example, through the use of a resource utilization budget or similar mechanism that is maintained for each entity that is associated with I/O requests that are serviced by the storage system (802).

Figure 11:
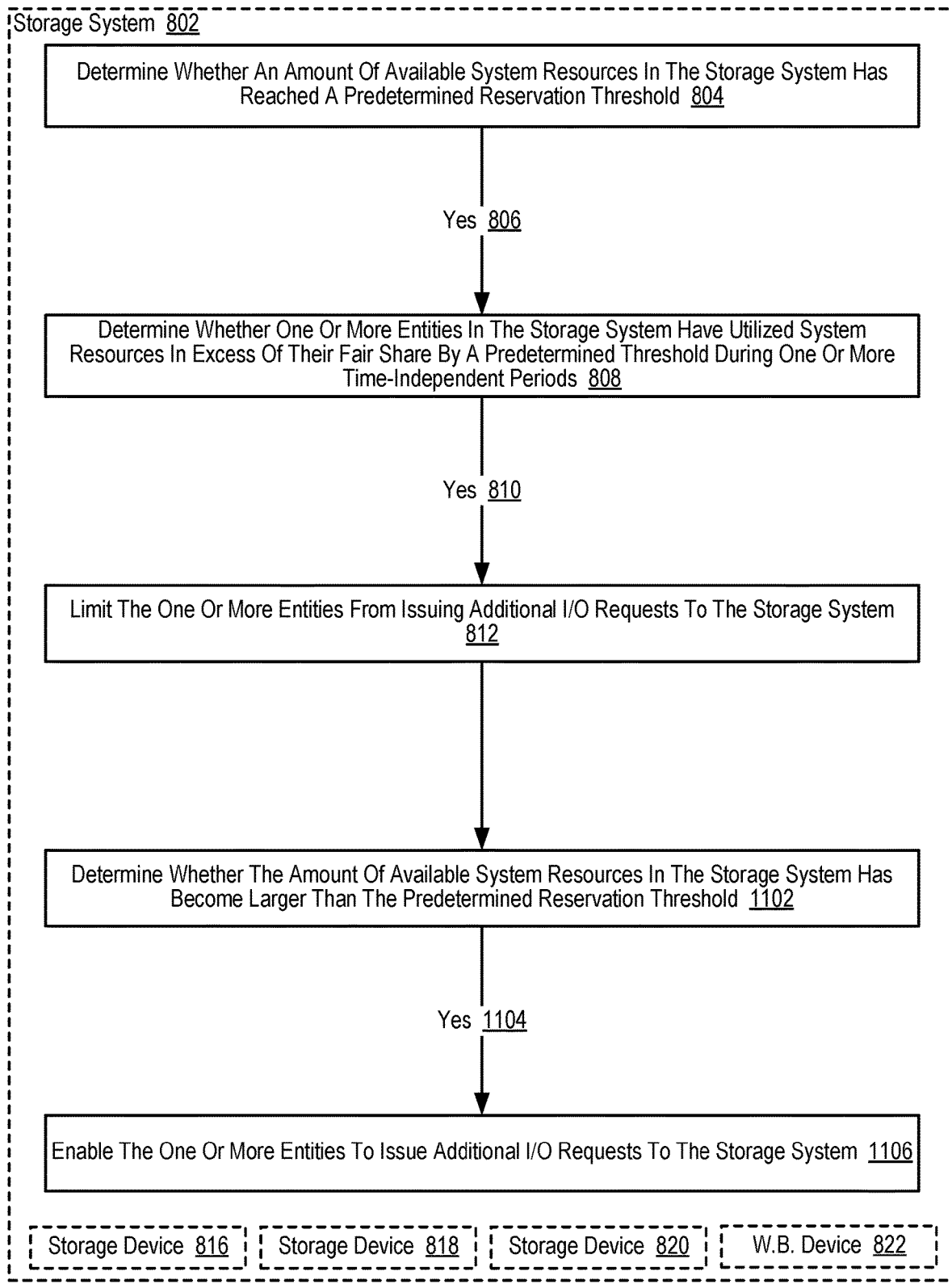
FIG. 11 sets forth a flow chart illustrating an additional example method for ensuring the fair utilization of system resources using workload based, time-independent scheduling according to embodiments of the present disclosure.

For further explanation, FIG. 11 sets forth a flow chart illustrating an additional example method for ensuring the fair utilization of system resources using workload based, time-independent scheduling according to embodiments of the present disclosure. The example method depicted in FIG. 11 is similar to the example method depicted in FIG. 8, as the example method depicted in FIG. 11 also includes determining (802) whether an amount of available system resources in the storage system (802) has reached a predetermined reservation threshold, determining (808) whether one or more entities in the storage system (802) have utilized system resources in excess of their fair share by a predetermined threshold during one or more time-independent periods, and limiting (812) the one or more entities from issuing additional I/O requests to the storage system (802).

The example method depicted in FIG. 11 also includes determining (1102) whether the amount of available system resources in the storage system (802) has become larger than the predetermined reservation threshold. Determining (1102) whether the amount of available system resources in the storage system (802) has become larger than the predetermined reservation threshold may be carried out, for example, by comparing the total amount a particular system resource that exists in the storage system (802) to the total amount the particular system resource that is currently available. Continuing with the example in which a system resource such a write buffer device (822) is associated with a predetermined reservation threshold of 10%, if the total capacity of the write buffer device (822) is 1 TB, the amount of available system resources in the storage system (802) will have become larger than the predetermined reservation threshold when the amount of free space in the write buffer device (822) becomes larger than 100 TB.

The example method depicted in FIG. 11 also includes, in response to affirmatively (1104) determining that the amount of available system resources in the storage system (802) has become larger than the predetermined reservation threshold, enabling (1106) the one or more entities to issue additional I/O requests to the storage system (804). In the example method depicted in FIG. 11, enabling (1106) the one or more entities to issue additional I/O requests to the storage system (804) may be carried out by removing any limitations that were previously in place for entities one or more entities in the storage system (802) that have utilized system resources in excess of their fair share and were previously limited (812) from issuing additional I/O requests to the storage system (802).

Figure 12:
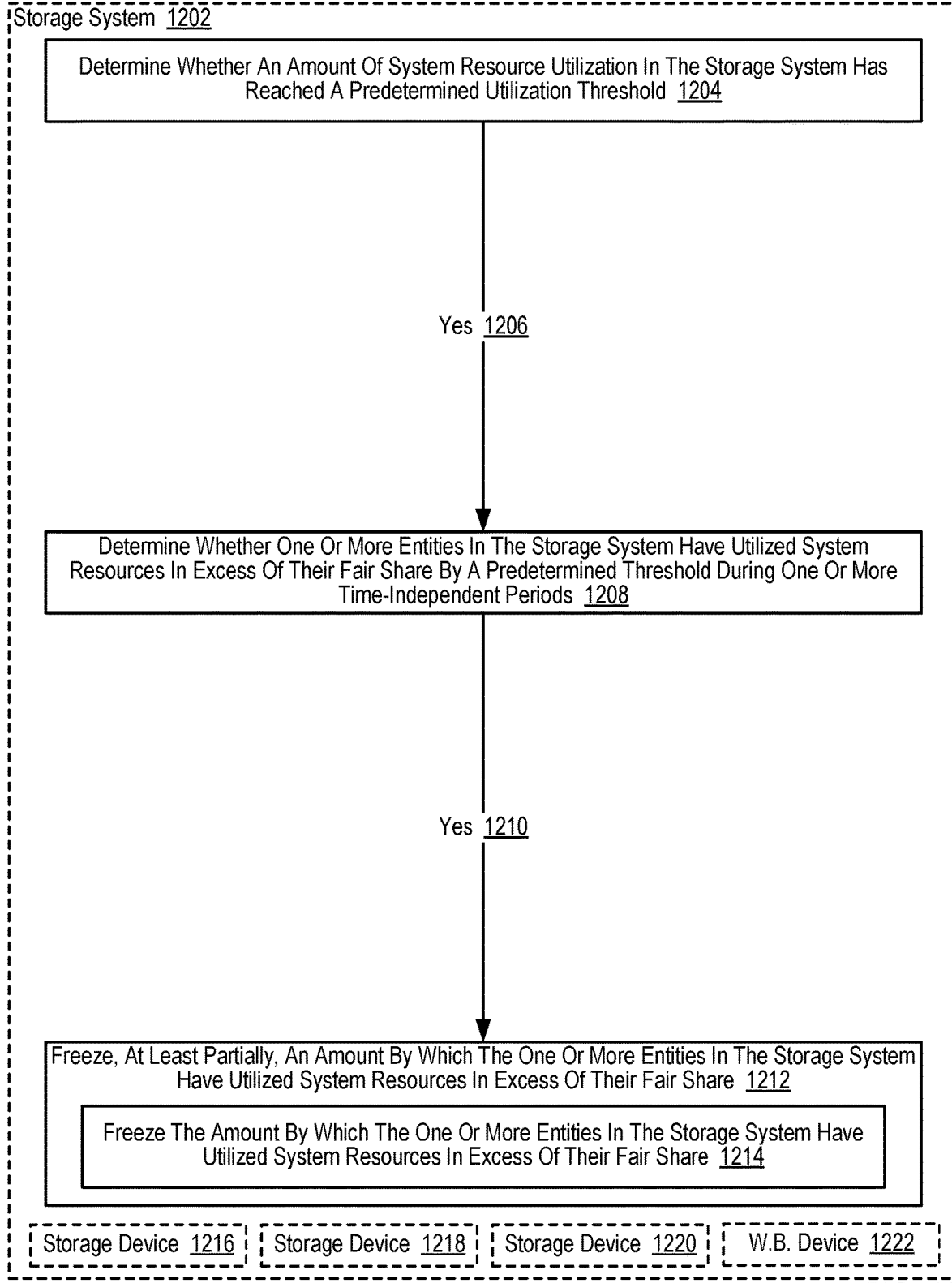
FIG. 12 sets forth a flow chart illustrating an additional example method for ensuring the fair utilization of system resources using workload based, time-independent scheduling according to embodiments of the present disclosure.

For further explanation, FIG. 12 sets forth a flow chart illustrating an additional example method for ensuring the fair utilization of system resources using workload based, time-independent scheduling according to embodiments of the present disclosure. The example method depicted in FIG. 12 may be carried out, for example, by a scheduling module as described above with reference to FIG. 2. The scheduling module may be executing on computer hardware within a storage system (1202) that, although depicted in less detail in FIG. 12, may be similar to the storage systems described above with reference to FIGS. 1-3.

The example method depicted in FIG. 12 also includes determining (1204) whether an amount of system resource utilization in the storage system (1202) has reached a predetermined utilization threshold. The predetermined utilization threshold can represent an amount of system resources that may be used before restrictions are put in place, so that some portion of the system resource generally remains available. Consider an example in which a system resource such a write buffer device (1222), as described above with reference to FIG. 1, is associated with a predetermined utilization threshold of 90%. As described above, such a write buffer device (1222) may be utilized as a quickly accessible buffer for data destined to be written to one or the storage devices (1216, 1218, 1220) in the storage system (1202). By utilizing the write buffer device (1222) in such a way, the write latency experienced by users of the storage system (1202) may be significantly improved relative to storage systems that do not include such write buffer devices (1222). The write latency experienced by users of the storage system (1202) may be significantly improved relative to storage systems that do not include such a write buffer device (1202) because a storage array controller may send an acknowledgment to the user of the storage system (1202) indicating that a write request has been serviced once the data associated with the write request has been written to one or the write buffer devices (1222), even if the data associated with the write request has not yet been written to any of the storage devices (1216, 1218, 1220). Readers will appreciate that if the write buffer device (1222) becomes completely full, system performance may suffer significantly. As such, it may be prudent to restrict access to some portion of the write buffer device (1222) through the use of a predetermined utilization threshold.

In the example method depicted in FIG. 12, determining (1204) whether an amount of system resource utilization in the storage system (1202) has reached a predetermined utilization threshold may be carried out, for example, by comparing the total amount a particular system resource that exists in the storage system (1202) to the total amount the particular system resource that is currently available, comparing the total amount a particular system resource that exists in the storage system (1202) to the total amount the particular system resource that is currently in use, or in other ways. Continuing with the example in which a system resource such a write buffer device (1222) is associated with a predetermined utilization threshold of 90%, if the total capacity of the write buffer device (822) is 1 TB and the amount of free space in the write buffer device is 100 GB, the amount of write buffer (1222) utilization has reached the predetermined utilization threshold.

The example method depicted in FIG. 12 also includes, in response to affirmatively 1206) determining that the amount of system resource utilization in the storage system (1202) has reached a predetermined utilization threshold, determining (1208) whether one or more entities in the storage system have utilized system resources in excess of their fair share by a predetermined threshold during a time-independent period. In the example method depicted in FIG. 12, the fair share of a particular system resource for each entity that is associated with incoming I/O requests may be determined by dividing the total amount of the particular system resource that is in the storage system (1202) by the number of entities that are actively associated with I/O requests that are being serviced by the storage system (1202). Continuing with the example described above in which a system resource such a write buffer device (1222) has a total capacity of 1 TB, if there are 10 entities that are actively associated with I/O requests that are being serviced by the storage system (1202), the fair share of write buffer device (1222) resources for each entity is 100 GB.

In the example method depicted in FIG. 12, determining (1208) whether one or more entities in the storage system (1202) have utilized system resources in excess of their fair share by a predetermined threshold during one or more time-independent periods may be carried out, for example, by comparing the amount of a particular system resource that is utilized by each entity to the fair share of such a resource for each entity. Continuing with the example described above in which a system resource such a write buffer device (1222) has a total capacity of 1 TB, there are 10 entities that are actively associated with I/O requests that are being serviced by the storage system (1202), and the fair share of write buffer device (1222) resources for each entity is 100 GB, assume that 150 GB of the data stored on the write buffer device (1222) is attributable to a first entity. In such an example, the first entity has utilized more than its fair share of the write buffer device (1222) resources available in the storage system (1202). In such an example, determining (1208) whether one or more entities in the storage system (1202) have utilized system resources in excess of their fair share by a predetermined threshold during one or more time-independent periods may be carried out by comparing the amount of system resources that a particular entity utilized in excess of its fair share to the predetermined threshold. In some embodiments, the predetermined threshold may be set to a non-zero value to allow for some level of resource utilization in excess of an entity's fair share, and in other embodiments the predetermined threshold may be set of a value of zero.

The example method depicted in FIG. 12 also includes, in response to affirmatively (1210) determining that one or more entities in the storage system (1202) have utilized system resources in excess of their fair share by the predetermined threshold during the time-independent period, freezing (1212), at least partially, an amount by which the one or more entities in the storage system (1202) have utilized system resources in excess of their fair share. Freezing (1212), at least partially, an amount by which the one or more entities in the storage system (1202) have utilized system resources in excess of their fair share may be carried out through the use of a resource utilization budget or similar mechanism that is maintained for each entity that is associated with I/O requests that are serviced by the storage system (1202). In such an example, when an I/O request that is associated with a particular entity is issued to the storage system (1202), the resource utilization budget for the particular entity may be debited by an amount that is equal to the amount of system resources required to service the I/O operation. If a particular entity utilized system resources in excess of their fair share the entity may ultimately be blocked from issuing additional I/O requests to the storage system (1202). Readers will appreciate that in some embodiments, as the resource utilization budget for entities are credited (e.g., upon the expiration of a time-independent period), crediting the resource utilization budget for an entity that is blocked from issuing additional I/O requests to the storage system (1202) may have the unintended consequence of making an over-consuming entity appear to be an entity that is not consuming more than its fair share of system resources by virtue of the entity being blocked from issuing additional I/O requests to the storage system (1202). To avoid this outcome, in the example method depicted in FIG. 12, the amount by which the one or more entities in the storage system (1202) have utilized system resources in excess of their fair share may be at least partially frozen (1212). Freezing (1212), at least partially, an amount by which the one or more entities in the storage system (1202) have utilized system resources in excess of their fair share may be carried out, for example, by decreasing the extent to which the resource utilization budget for an entity that is blocked from issuing additional I/O requests to the storage system (1202) is credited while the entity is blocked from issuing additional I/O requests to the storage system (1202).

In the example method depicted in FIG. 12, freezing (1212), at least partially, an amount by which the one or more entities in the storage system (1202) have utilized system resources in excess of their fair share can include freezing (1214) the amount by which the one or more entities in the storage system (1202) have utilized system resources in excess of their fair share. In the example method depicted in FIG. 12, freezing (1214) the amount by which the one or more entities in the storage system (1202) have utilized system resources in excess of their fair share may be carried out, for example, by ceasing to credit the resource utilization budget for an entity that is blocked from issuing additional I/O requests to the storage system (1202) while the entity is blocked from issuing additional I/O requests to the storage system (1202).

Figure 13:
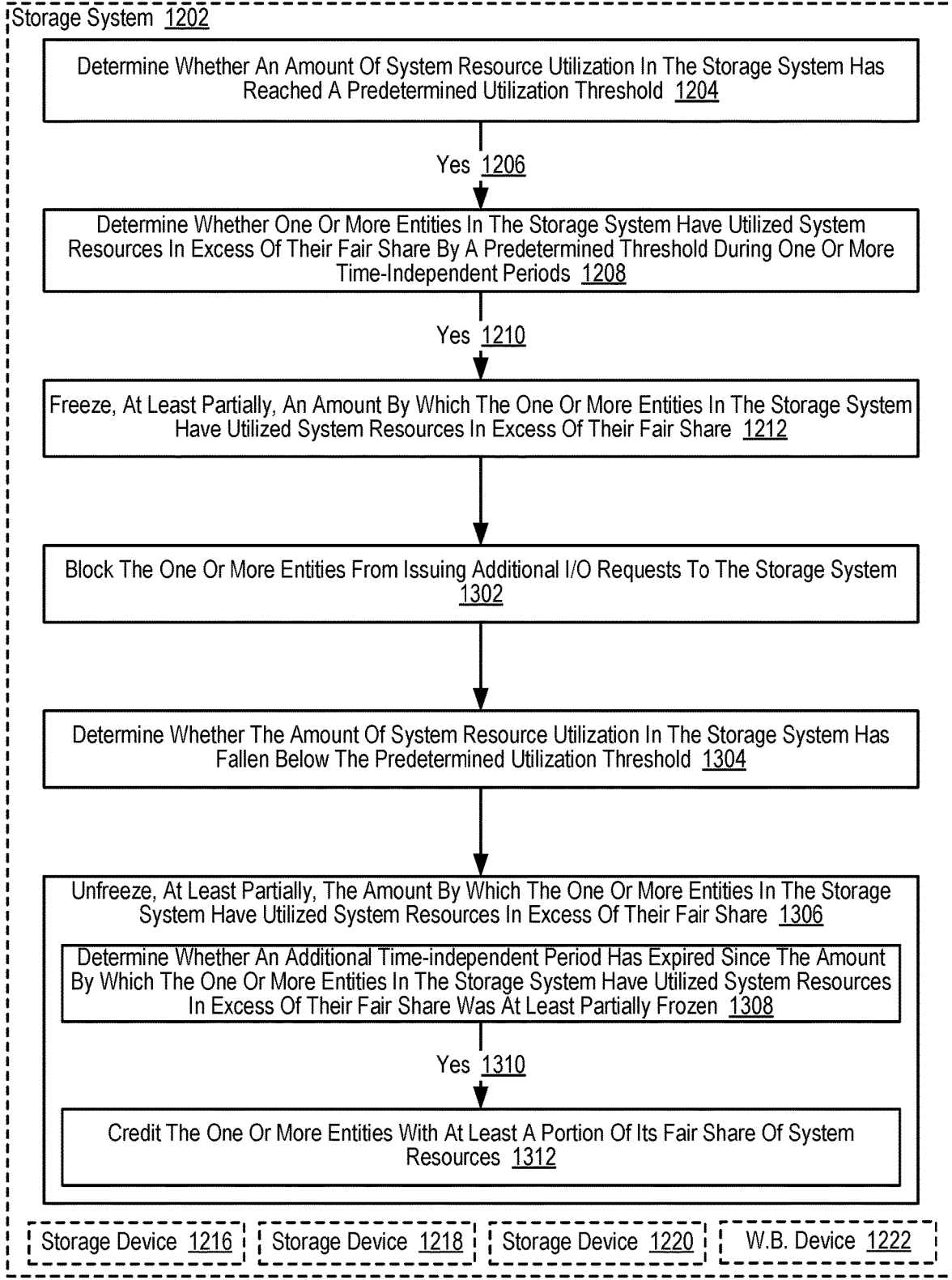
FIG. 13 sets forth a flow chart illustrating an additional example method for ensuring the fair utilization of system resources using workload based, time-independent scheduling according to embodiments of the present disclosure.

For further explanation, FIG. 13 sets forth a flow chart illustrating an additional example method for ensuring the fair utilization of system resources using workload based, time-independent scheduling according to embodiments of the present disclosure. The example method depicted in FIG. 13 is similar to the example method depicted in FIG. 12, as the example method depicted in FIG. 13 also includes determining (1204) whether an amount of system resource utilization in the storage system (1202) has reached a predetermined utilization threshold, determining (1208) whether one or more entities in the storage system have utilized system resources in excess of their fair share by a predetermined threshold during a time-independent period in response to affirmatively (1206) determining that the amount of system resource utilization in the storage system (1202) has reached a predetermined utilization threshold, and freezing (1212), at least partially, an amount by which the one or more entities in the storage system (1202) have utilized system resources in excess of their fair share in response to affirmatively (1210) determining that one or more entities in the storage system (1202) have utilized system resources in excess of their fair share by the predetermined threshold during the time-independent period.

The example method depicted in FIG. 13 also includes, in response to affirmatively (1210) determining that one or more entities in the storage system (1202) have utilized system resources in excess of their fair share by the predetermined threshold during the time-independent period, blocking (1302) the one or more entities from issuing additional I/O requests to the storage system (1202). By blocking (1302) the one or more entities from issuing additional I/O requests to the storage system (1202), the one or more entities that have utilized more than their fair share of system resources may be entirely prohibited from having any additional I/O requests associated with such an entity issued to the storage system (1202). The one or more entities may be blocked (1302) from issuing additional I/O requests to the storage system (1202), for example, until a resource utilization balance as described above is restored to an acceptable level through the use of a debiting and crediting system described above, until the amount of available system resources in the storage system (1202) has fallen below the predetermined reservation threshold, or until the occurrence of some other event. Readers will appreciate that in other embodiments, the one or more entities that have utilized more than their fair share of system resources may be only partially prohibited (i.e., limited) from having any additional I/O requests associated with such an entity issued to the storage system (1202).

The example method depicted in FIG. 13 also includes determining (1304) whether the amount of system resource utilization in the storage system (1202) has fallen below the predetermined utilization threshold. Determining (1304) whether the amount of system resource utilization in the storage system (1202) has fallen below the predetermined utilization threshold may be carried out, for example, by comparing the total amount a particular system resource that exists in the storage system (1202) to the total amount the particular system resource that is currently available, by comparing the total amount a particular system resource that exists in the storage system (1202) to the total amount the particular system resource that is currently in use, or in other ways. Continuing with the example in which a system resource such a write buffer device (1222) is associated with a predetermined utilization threshold of 90%, if the total capacity of the write buffer device (1222) is 1 TB, the amount of system resource utilization in the storage system (1202) will have fallen below the predetermined utilization threshold when the amount of free space in the write buffer device (1222) becomes larger than 100 TB.

The example method depicted in FIG. 13 also includes, in response to affirmatively (1310) determining that one or more entities in the storage system (1202) have utilized system resources in excess of their fair share by the predetermined threshold during the time-independent period, unfreezing (1306), at least partially, the amount by which the one or more entities in the storage system (1202) have utilized system resources in excess of their fair share. Unfreezing (1306), at least partially, the amount by which the one or more entities in the storage system (1202) have utilized system resources in excess of their fair share may be carried out through the use of a resource utilization budget or similar mechanism that is maintained for each entity that is associated with I/O requests that are serviced by the storage system (1202). In such an example, when an I/O request that is associated with a particular entity is issued to the storage system (1202), the resource utilization budget for the particular entity may be debited by an amount that is equal to the amount of system resources required to service the I/O operation. In the example method depicted in FIG. 12, at least partially unfreezing (1306) the amount by which the one or more entities in the storage system (1202) have utilized system resources in excess of their fair share may be carried out, for example, by enabling the resource utilization budget for an entity that is blocked from issuing additional I/O requests to the storage system (1202) to be credited.

In the example method depicted in FIG. 13, at least partially unfreezing (1306) the amount by which the one or more entities in the storage system (1202) have utilized system resources in excess of their fair share can include determining (1308) whether an additional time-independent period has expired since the amount by which the one or more entities in the storage system (1202) have utilized system resources in excess of their fair share was at least partially frozen (1212). In the example method depicted in FIG. 13, in response to affirmatively (1310) determining that the additional time-independent period has expired since the amount by which the one or more entities in the storage system (1202) have utilized system resources in excess of their fair share was at least partially frozen (1212), crediting (1312) the one or more entities with at least a portion of its fair share of system resources.

Figure 14:
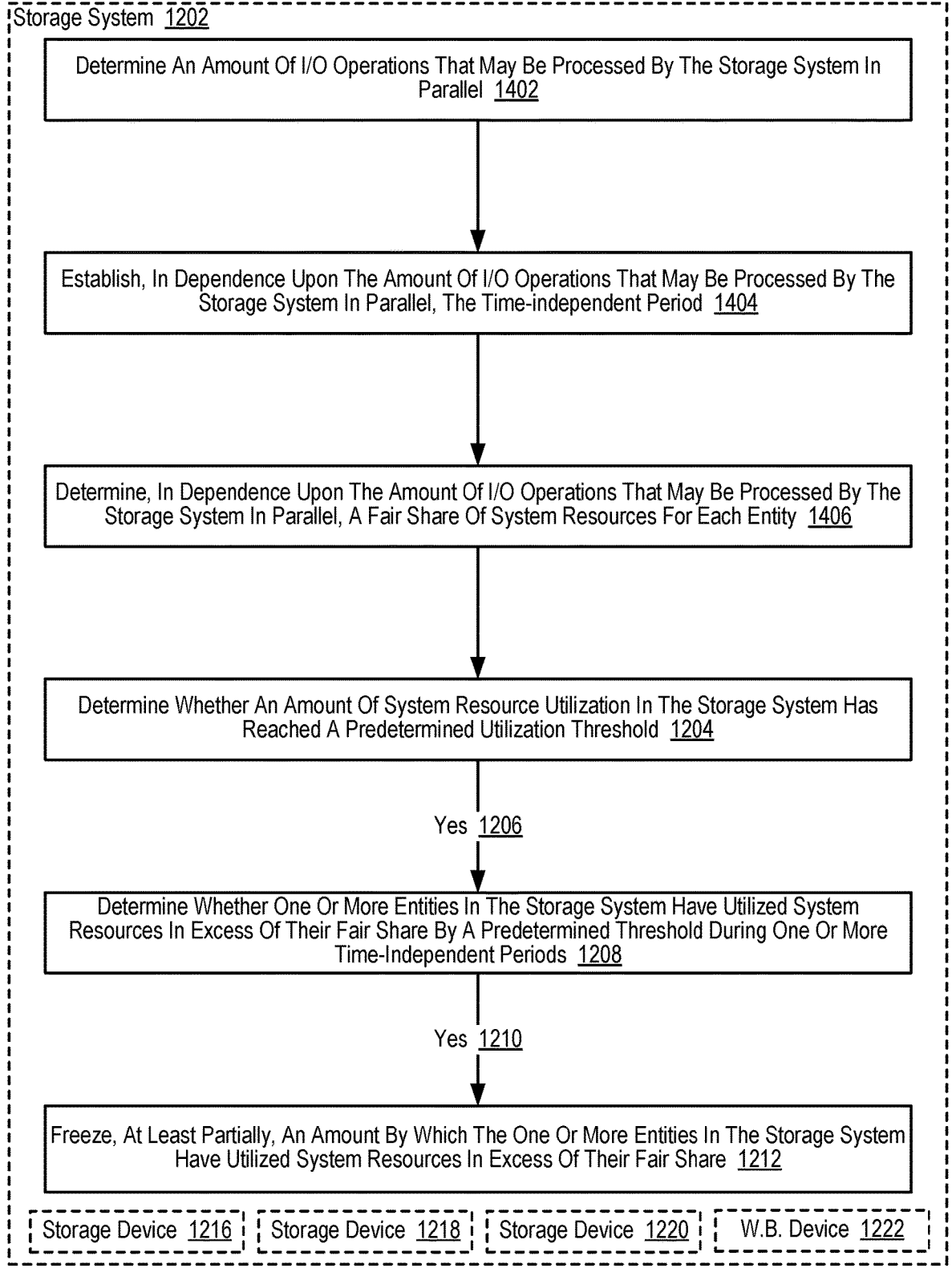
FIG. 14 sets forth a flow chart illustrating an additional example method for ensuring the fair utilization of system resources using workload based, time-independent scheduling according to embodiments of the present disclosure.

For further explanation, FIG. 14 sets forth a flow chart illustrating an additional example method for ensuring the fair utilization of system resources using workload based, time-independent scheduling according to embodiments of the present disclosure. The example method depicted in FIG. 14 is similar to the example method depicted in FIG. 12, as the example method depicted in FIG. 14 also includes determining (1204) whether an amount of system resource utilization in the storage system (1202) has reached a predetermined utilization threshold, determining (1208) whether one or more entities in the storage system have utilized system resources in excess of their fair share by a predetermined threshold during a time-independent period in response to affirmatively (1206) determining that the amount of system resource utilization in the storage system (1202) has reached a predetermined utilization threshold, and freezing (1212), at least partially, an amount by which the one or more entities in the storage system (1202) have utilized system resources in excess of their fair share in response to affirmatively (1210) determining that one or more entities in the storage system (1202) have utilized system resources in excess of their fair share by the predetermined threshold during the time-independent period.

The example method depicted in FIG. 14 also includes determining (1402) an amount of I/O requests that may be processed by the storage system (1202) in parallel. Determining (1402) an amount of I/O requests that may be processed by the storage system (1202) in parallel may be carried out, for example, through the use of one or more test suites that issue I/O requests to the storage system (1202). Alternatively, determining (1402) an amount of I/O requests that may be processed by the storage system (1202) in parallel may be carried out by monitoring actual system performance during operation of the storage system (1202) and identifying workload levels that cause system performance to degrade, as such a degradation in system performance may be indicative that system capacity has been fully utilized. In such an example, monitoring actual system performance during operation of the storage system (1202) may be carried out indefinitely as amount of I/O requests that may be processed by the storage system (1202) in parallel may change over time in response to components within the storage system (1202) aging, in response to the storage system (1202) storing more data, and for a variety of other reasons.

Although not expressly depicted in FIG. 14, readers will appreciate that determining (1402) an amount of I/O requests that may be processed by the storage system (1202) in parallel can include determining the amount of I/O requests that may be processed by the storage system (1202) in parallel while adhering to a performance requirement. Such a performance requirement may specify, for example, the maximum permissible amount of time that may lapse between the time that an I/O request is issued to the storage system (1202) and the time that the storage system (1202) indicates that the I/O request has been serviced. Readers will appreciate that in other embodiments, other or additional performance criteria may be taken into consideration as determining an amount of I/O requests that may be processed by the storage system (1202) in parallel while adhering to a performance requirement can potentially include determining the amount of I/O requests that may be processed by the storage system (1202) in parallel while adhering to a read latency requirement, determining the amount of I/O requests that may be processed by the storage system (1202) in parallel while adhering to a write latency requirement, determining the amount of I/O requests that may be processed by the storage system (1202) in parallel while adhering to an IOPS requirement, or determining the amount of I/O requests that may be processed by the storage system (1202) in parallel while adhering to other requirements. In such an example, one or more of such performance criteria may be taken into consideration when determining an amount of I/O requests that may be processed by the storage system (1202) in parallel while adhering to a performance requirement.

The example method depicted in FIG. 14 also includes establishing (1404), in dependence upon the amount of I/O requests that may be processed by the storage system (1202) in parallel, the time-independent period. Establishing (1404), in dependence upon the amount of I/O requests that may be processed by the storage system (1202) in parallel, the time-independent period may be carried out by establishing a time-independent period that includes one or more generations of I/O requests. In such an example, each generation of I/O requests may be equal to the amount of I/O requests that the storage system (1202) may process in parallel. Consider the example described above in which the storage system (1202) can execute 1000 units of I/O requests in parallel while meeting a predetermined performance threshold. In such an example, a first generation of I/O requests may be defined as the first 1000 units of I/O requests executed by the storage system (1202), a second generation of I/O requests may be defined as the second 1000 units of I/O requests executed by the storage system (1202), and so on. Readers will appreciate that one or more generations of I/O requests is a time-independent period, as a generation of I/O requests may only cover a small period of time when the storage system (1202) is receiving a relatively large number of I/O requests while another generation of I/O requests may cover a much larger period of time when the storage system (1202) is receiving a relatively small number of I/O requests. In the example method depicted in FIG. 9, the time-independent period can include an amount of most recently processed I/O requests that is a function of the amount of I/O requests that may be processed by the storage system (1202) in parallel as the time-independent period can include an amount of most recently processed I/O requests that is equal to an integer multiple of the amount of I/O requests that may be processed by the storage system in parallel, the time-independent period can include an amount of most recently processed I/O requests that is equal to an fractional portion of the amount of I/O requests that may be processed by the storage system in parallel, and so on.

The example method depicted in FIG. 14 also includes determining (1406), in dependence upon the amount of I/O requests that may be processed by the storage system (1202) in parallel, a fair share of system resources for each entity. Determining (1406) a fair share of system resources for each entity in dependence upon the amount of I/O requests that may be processed by the storage system (1202) in parallel may be carried out, for example, by determining how many entities are actively associated with incoming I/O requests and dividing the amount of I/O requests that may be processed by the storage system (1202) in parallel equally among the entities that are actively associated with incoming I/O requests. A particular entity may be deemed to be 'actively' associated with incoming I/O requests, for example, if any I/O requests that are associated with the particular entity have been received during a predetermined number of most recent I/O generations. Readers will appreciate that although FIG. 14 describes determining (1406) a fair share of system resources for each entity in dependence upon the amount of I/O requests that may be processed by the storage system (1202) in parallel, the fair share of system resources for each entity may be determined (1406) in dependence upon the amount of I/O requests that may be processed by the storage system (1202) in parallel while adhering to one or more performance criteria.

For further explanation, FIG. 15 sets forth a flow chart illustrating an example method for adapting target service times in a storage system according to embodiments of the present disclosure. The example method depicted in FIG. 15 may be carried out, for example, by a scheduling module as described above with reference to FIG. 2. The scheduling module may be executing on computer hardware within a storage system (1202) that, although depicted in less detail in FIG. 15, may be similar to the storage systems described above with reference to FIGS. 1-3. Further, the method depicted in FIG. 15 may be carried out by a single storage array within the storage system (1202).

The example method depicted in FIG. 15 includes, in response to detecting that a measured service time for I/O requests in a storage system (1202) is failing to meet a target service time for the I/O requests, reducing (1502) an I/O capacity of the I/O requests in the storage system (1202). Detecting that a measured service time for I/O requests in a storage system (1202) is failing to meet a target service time for the I/O requests may be carried out by obtaining the measured service time for the I/O requests and comparing the measured service time to the target service time. Servicing an I/O request requires an amount of time from the point at which an I/O request is issued to the storage system to the point at which that the storage system indicates that the I/O request has been serviced. The inherent service time of an I/O request refers to a period of time taken by the storage system or storage array to service the I/O request without contention (e.g., queue time, delays for other I/O requests, etc.). The measured service time is the observed time period that includes the inherent service time and queue time arising from contention. The measured service time may be measured or calculated by the storage system (1202) for one or more I/O requests. The measured service time may also be an average for a group of I/O operations (e.g., the 1000 most recent I/O operations).

The target service time may be a performance requirement for the storage system. Specifically, the service time may specify the anticipated amount of time that may lapse between the time that an I/O request is issued to the storage system and the time that the storage system indicates that the I/O request has been serviced. The target service time may be based on a known service time for I/O requests in a fully operational storage system (1202) that includes no malfunctioning components. The target service time may be a maximum predicted time for each I/O request in the storage system (1202) (i.e., any given I/O request should take no longer than the target service time to process). Alternatively, the target service time may be a maximum average predicted time for a group or batch of I/O requests in the storage system (1202). The target service time may be derived by the storage system or storage array using the measured service time and inherent service time.

Detecting that a measured service time for I/O requests in a storage system (1202) is failing to meet a target service time for the I/O requests may be carried out by determining that the measured service time is greater than the target service time for I/O requests. Detecting that a measured service time for I/O requests in a storage system (1202) is failing to meet a target service time for the I/O requests may also include determining that the difference between the measured service time and the target service time is greater than a threshold amount of time. Detecting that a measured service time for I/O requests in a storage system (1202) is failing to meet a target service time for the I/O requests may further include multiple (e.g., several hundred) comparisons of measured service times to the target service time.

The I/O capacity of the I/O requests is a measure of allowable concurrency in the storage system (1202) or storage array. The I/O capacity refers to of concurrent I/O requests allowed for processing by the storage system (1202) or storage array. Different I/O requests may utilize a greater amount of capacity, so the I/O capacity may not be in terms of absolute number of I/O requests. Reducing (1502) the I/O capacity of the I/O requests in the storage system (1202) refers to preparing fewer I/O request for processing per unit of time than were previously prepared. In fully operational storage systems (1202), the measured service time can be maintained below or approximately equal to the target service time by controlling concurrency (i.e., I/O capacity). However, for storage systems with malfunctioning equipment or software (e.g., a faulty storage device), the measured service time cannot be maintained below or approximately equal to the target service by controlling concurrency (i.e., I/O capacity). Managing I/O capacity in a storage system with malfunctioning equipment or software may not effectively reduce the increased measured service time. Further, reducing I/O capacity may worsen performance by increasing queue times without the benefit of shorted service time.

The example method depicted in FIG. 15 also includes determining (1504) that reducing the I/O capacity of the I/O requests to meet to the target service time causes the I/O capacity of the I/O requests to cross a threshold I/O capacity for the storage system (1202). Determining (1504) that reducing the I/O capacity of the I/O requests to meet to the target service time causes an I/O capacity of the I/O requests to cross a threshold I/O capacity for the storage system (1202) may be carried out by comparing the I/O capacity of the I/O requests to the threshold I/O capacity for the storage system (1202). The storage system (1202) may incrementally reduce the I/O capacity of the I/O requests to address the increased measured service time. At a certain point, the I/O capacity may be reduced to such a degree as to meet or cross the threshold I/O capacity for the storage system (1202).

The threshold I/O capacity is a predetermined minimum level of I/O capacity for the storage system (1202) or storage array. The threshold I/O capacity may be based on a level of I/O capacity that is indicative of a hardware or software malfunction on the storage system (1202) or storage array. The threshold I/O capacity may be relative to an estimated baseline I/O capacity for the storage system (1202) or storage array. The estimated baseline I/O capacity may be the predicted amount of I/O capacity able to be processed in a fully operational storage system or storage array.

The circumstance in which the measured service time is not consistent with the target service time such that the I/O capacity of the storage system is reduced below the threshold I/O capacity can indicate an issue with servicing I/O requests rather than the queuing or concurrency of the storage system. Thus, this mechanism may be used to determine a cause or category of causes of an increased service time. Such causes may include a faulty storage device (e.g., faulty solid state drive), a network miswiring, or unbalanced storage devices.

The example method depicted in FIG. 15 also includes, in response to determining (1506) that the I/O capacity of the I/O requests has crossed the threshold I/O capacity for the storage system (1202): determining (1508) an updated service time based on the measured service time for the I/O requests in the storage system (1202); and updating (1510) the target service time based on the updated service time. Determining (1508) an updated service time based on the measured service time for the I/O requests in the storage system (1202) may be carried out by retrieving the measured service time and calculating the updated service time based on the retrieved measured service time. The updated service time may be the result of a manipulation of the measured service time. For example, the updated service time may be a few time units lower or higher than the measured service time.

Determining (1508) an updated service time based on the measured service time for the I/O requests in the storage system (1202) may be carried out by determining the updated service time based on a plurality of measured service times for the I/O requests. Determining the updated service time based on a plurality of measured service times for the I/O requests may be carried out by calculating a mean, median, or mode of the plurality of measured service times.

Updating (1510) the target service time based on the updated service time may be carried out by replacing the current target service time with the updated service time. Updating (1510) the target service time based on the updated service time may be carried out by increasing the target service time. By updating the target service time to a level more consistent with the measured service time, the storage system (1202) may not trigger a further reduction of the I/O capacity.

For further explanation, FIG. 16 sets forth a flow chart illustrating an additional example method for adapting target service times in a storage system according to embodiments of the present disclosure. The example method depicted in FIG. 16 is similar to the example method depicted in FIG. 15, as the example method depicted in FIG. 16 also includes in response to detecting that a measured service time for I/O requests in a storage system (1202) is failing to meet a target service time for the I/O requests, reducing (1502) an I/O capacity of the I/O requests in the storage system (1202); determining (1504) that reducing the I/O capacity of the I/O requests to meet to the target service time causes the I/O capacity of the I/O requests to cross a threshold I/O capacity for the storage system (1202); and in response to determining (1506) that the I/O capacity of the I/O requests has crossed the threshold I/O capacity for the storage system (1202): determining (1508) an updated service time based on the measured service time for the I/O requests in the storage system (1202); and updating (1510) the target service time based on the updated service time.

The example method depicted in FIG. 16 also includes, in response to detecting (1602) that a subsequently measured service time for the I/O requests in the storage system (1202) is less than the target service time for the I/O requests and that the I/O capacity for the I/O requests is above the threshold I/O capacity for the storage system (1202): determining (1604) a restored service time based on the subsequently measured service time for the I/O requests in the storage system (1202); and updating (1606) the target service time based on the restored service time.

At some point after the target service time is updated, changes to the storage system (1202) may be made to address the malfunctioning hardware or software that caused the increased measured service time (e.g., replacing a faulty storage device). Once the malfunctioning hardware or software is addressed, the measured service time may decrease below the target service time. Detecting (1602) that a subsequently measured service time for the I/O requests in the storage system (1202) is less than the target service time for the I/O requests may be carried out by comparing the subsequently measured service time to the updated target service time and determining that the measured service time is less than the target service time. Detecting (1602) that a subsequently measured service time for the I/O requests in the storage system (1202) is less than the target service time for the I/O requests may also be carried out by determining that the difference between the subsequently measured service time and the updated target service time is greater than a threshold amount of time. The subsequently measured service time refers to a service time measured after a change has been made to the storage system (1202) to address the increased measured service time.

Detecting that the I/O capacity for the I/O requests is above the threshold I/O capacity for the storage system (1202) may be carried out by comparing the current I/O capacity to the threshold I/O capacity. The storage system (1202) may increase the I/O capacity as the storage system detects that the subsequently measured service time remains below the updated target service time. Once both the subsequently measured service time for the I/O requests in the storage system (1202) is less than the target service time for the I/O requests and the I/O capacity for the I/O requests is above the threshold I/O capacity for the storage system (1202), then the restored service time may be determined.

Determining (1604) a restored service time based on the subsequently measured service time for the I/O requests in the storage system (1202) may be carried out by retrieving the subsequently measured service time and calculating the restored service time based on the retrieved subsequently measured service time. The restored service time may be the result of a manipulation of the subsequently measured service time. For example, the restored service time may be a few time units lower or higher than the subsequently measured service time.

Determining (1604) a restored service time based on the subsequently measured service time for the I/O requests in the storage system (1202) may be carried out by determining the restored service time based on a plurality of subsequently measured service times for the I/O requests. Determining the restored service time based on a plurality of subsequently measured service times for the I/O requests may be carried out by calculating a mean, median, or mode of the plurality of subsequently measured service times.

Updating (1606) the target service time based on the restored service time may be carried out by replacing the current target service time with the updated restored service time. Updating (1606) the target service time based on the restored service time may be carried out by decreasing the target service time. The restored service time refers to an updated target service time after a change has been made to the storage system (1202) to address the increased measured service time.

For further explanation, FIG. 17 sets forth a flow chart illustrating an additional example method for adapting target service times in a storage system according to embodiments of the present disclosure. The example method depicted in FIG. 17 is similar to the example method depicted in FIG. 15, as the example method depicted in FIG. 17 also includes in response to detecting that a measured service time for I/O requests in a storage system (1202) is failing to meet a target service time for the I/O requests, reducing (1502) an I/O capacity of the I/O requests in the storage system (1202); determining (1504) that reducing the I/O capacity of the I/O requests to meet to the target service time causes the I/O capacity of the I/O requests to cross a threshold I/O capacity for the storage system (1202); and in response to determining (1506) that the I/O capacity of the I/O requests has crossed the threshold I/O capacity for the storage system (1202): determining (1508) an updated service time based on the measured service time for the I/O requests in the storage system (1202); and updating (1510) the target service time based on the updated service time.

The example method depicted in FIG. 17 differs from the method depicted in FIG. 15 in that determining (1504) that reducing the I/O capacity of the I/O requests to meet to the target service time causes an I/O capacity of the I/O requests to cross a threshold I/O capacity for the storage system (1202) includes determining (1702) that reducing the I/O capacity of the I/O requests to meet to the target service time causes the I/O capacity of the I/O requests to fall below the threshold I/O capacity for the storage system (1202) a predetermined number of times. Determining (1702) that reducing the I/O capacity of the I/O requests to meet to the target service time causes the I/O capacity of the I/O requests to fall below the threshold I/O capacity for the storage system (1202) a predetermined number of times may be carried out by monitoring the I/O capacity as it is reduced and increased based on the measured service time and target service time. The I/O capacity may be reduced (or attempted to be reduced) below the threshold I/O capacity, and each time the threshold is crossed, a counter is incremented. Once the counter reached the predetermined number of times for crossing (or attempting to cross) the threshold, then updating the target service time may be triggered.

Readers will appreciate that although the many of the examples depicted in the Figures described above relate to various embodiments of the present disclosure, other embodiments are well within the scope of the present disclosure. In particular, steps depicted in one figure may be combined with steps depicted in other figures to create permutations of the embodiments expressly called out in the figures. Readers will further appreciate that although the example methods described above are depicted in a way where a series of steps occurs in a particular order, no particular ordering of the steps is required unless explicitly stated. Example embodiments of the present disclosure are described largely in the context of a fully functional computer system for adapting target service times in a storage system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
in response to determining that reducing an I/O capacity of I/O requests in a storage system to meet a target service time causes the I/O capacity of the I/O requests to cross a threshold I/O capacity for the storage system, determining an updated service time based on a measured service time for the I/O requests in the storage system;

updating a target service time for the I/O requests based on the updated service time;

in response to detecting that a subsequently measured service time for the I/O requests in the storage system is less than the target service time for the I/O requests, determining a restored service time based on the subsequently measured service time for the I/O requests in the storage system; and updating the target service time based on the restored service time.

2. The method of claim 1, wherein detecting that the subsequently measured service time for the I/O requests in the storage system is less than the target service time for the I/O requests and that the I/O capacity for the I/O requests is above the threshold I/O capacity for the storage system is in response to replacing a faulty storage device within the storage system.

3. The method of claim 1, wherein determining that reducing the I/O capacity of the I/O requests to meet to the target service time causes the I/O capacity of the I/O requests to cross the threshold I/O capacity for the storage system comprises determining that reducing the I/O capacity of the I/O requests to meet to the target service time causes the I/O capacity of the I/O requests to fall below the threshold I/O capacity for the storage system a predetermined number of times.

4. The method of claim 1, wherein determining the updated service time based on the measured service time for the I/O requests in the storage system comprises determining the updated service time based on a plurality of measured service times for the I/O requests.

5. The method of claim 1, wherein updating the target service time based on the updated service time comprises increasing the target service time.

6. The method of claim 1, wherein the threshold I/O capacity is relative to an estimated baseline I/O capacity for the storage system.

7. An apparatus including a computer memory and a computer processor, the computer memory including computer program instructions that, when executed by the computer processor, cause the apparatus to carry out the steps of:

in response to determining that reducing an I/O capacity of I/O requests in a storage system to meet a target service time causes the I/O capacity of the I/O requests to cross a threshold I/O capacity for the storage system, determining an updated service time based on a measured service time for the I/O requests in the storage system;

updating a target service time for the I/O requests based on the updated service time;

in response to detecting that a subsequently measured service time for the I/O requests in the storage system is less than the target service time for the I/O requests, determining a restored service time based on the subsequently measured service time for the I/O requests in the storage system; and updating the target service time based on the restored service time.

8. The apparatus of claim 7, wherein detecting that the subsequently measured service time for the I/O requests in the storage system is less than the target service time for the I/O requests and that the I/O capacity for the I/O requests is above the threshold I/O capacity for the storage system is in response to replacing a faulty storage device within the storage system.

9. The apparatus of claim 7, wherein determining that reducing the I/O capacity of the I/O requests to meet to the target service time causes the I/O capacity of the I/O requests to cross the threshold I/O capacity for the storage system comprises determining that reducing the I/O capacity of the I/O requests to meet to the target service time causes the I/O capacity of the I/O requests to fall below the threshold I/O capacity for the storage system a predetermined number of times.

10. The apparatus of claim 7, wherein determining the updated service time based on the measured service time for the I/O requests in the storage system comprises determining the updated service time based on a plurality of measured service times for the I/O requests.

11. The apparatus of claim 7, wherein updating the target service time based on the updated service time comprises increasing the target service time.

12. The apparatus of claim 7, wherein the threshold I/O capacity is relative to an estimated baseline I/O capacity for the storage system.

13. A storage system including a computer memory and a computer processor, the computer memory including computer program instructions that, when executed by the computer processor, cause the storage system to carry out the steps of:

in response to determining that reducing an I/O capacity of I/O requests in a storage system to meet a target service time causes the I/O capacity of the I/O requests to cross a threshold I/O capacity for the storage system, determining an updated service time based on a measured service time for the I/O requests in the storage system;

updating a target service time for the I/O requests based on the updated service time;

in response to detecting that a subsequently measured service time for the I/O requests in the storage system is less than the target service time for the I/O requests, determining a restored service time based on the subsequently measured service time for the I/O requests in the storage system; and updating the target service time based on the restored service time.

14. The storage system of claim 13, wherein detecting that the subsequently measured service time for the I/O requests in the storage system is less than the target service time for the I/O requests and that the I/O capacity for the I/O requests is above the threshold I/O capacity for the storage system is in response to replacing a faulty storage device within the storage system.

15. The storage system of claim 13, wherein determining that reducing the I/O capacity of the I/O requests to meet to the target service time causes the I/O capacity of the I/O requests to cross the threshold I/O capacity for the storage system comprises determining that reducing the I/O capacity of the I/O requests to meet to the target service time causes the I/O capacity of the I/O requests to fall below the threshold I/O capacity for the storage system a predetermined number of times.

16. The storage system of claim 13, wherein determining the updated service time based on the measured service time for the I/O requests in the storage system comprises determining the updated service time based on a plurality of measured service times for the I/O requests.

17. The storage system of claim 13, wherein updating the target service time based on the updated service time comprises increasing the target service time.

\* \* \* \* \*